Nov. 9, 1943.    L. H. CUSHMAN ET AL    2,333,708
ASSEMBLING MACHINE
Filed April 10, 1942    9 Sheets-Sheet 6

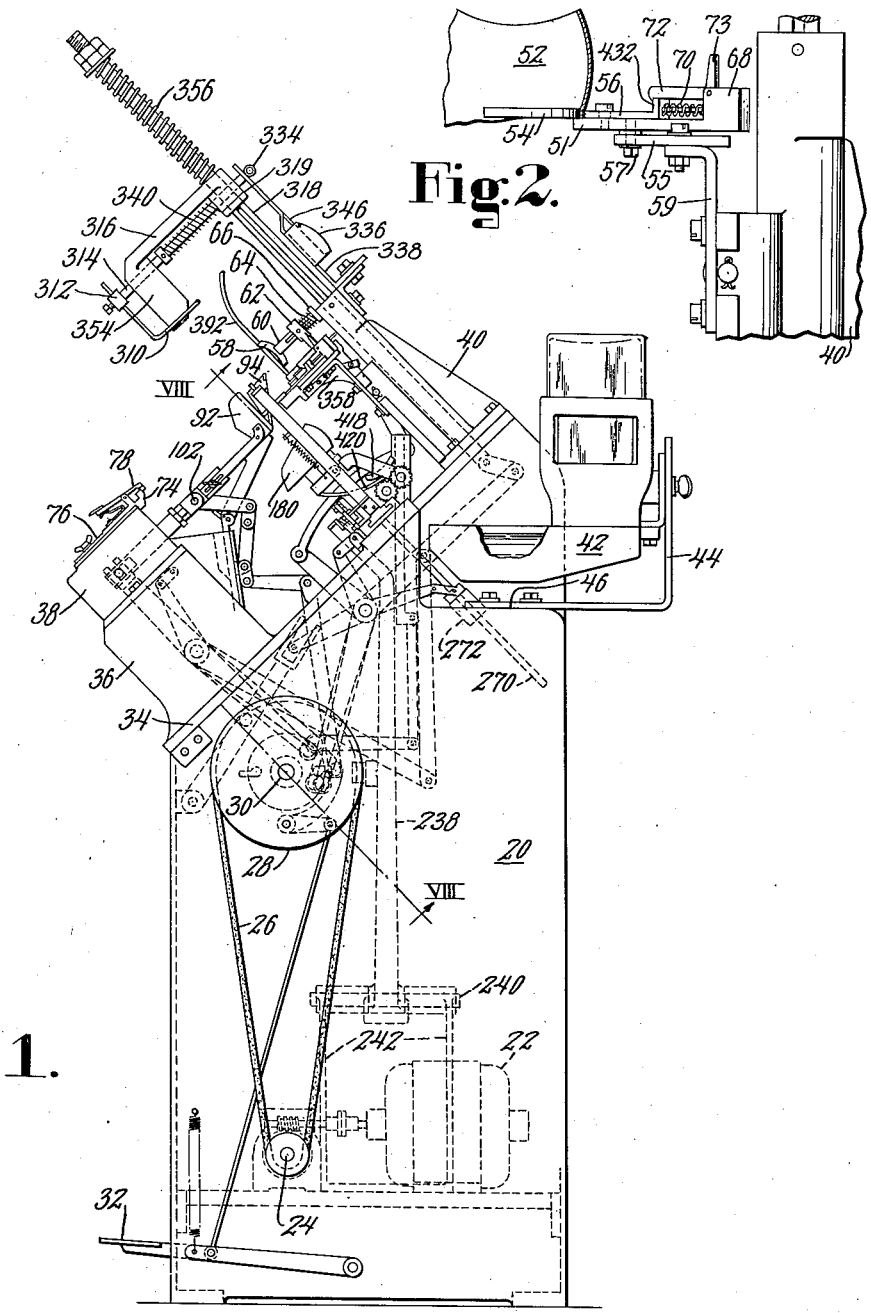

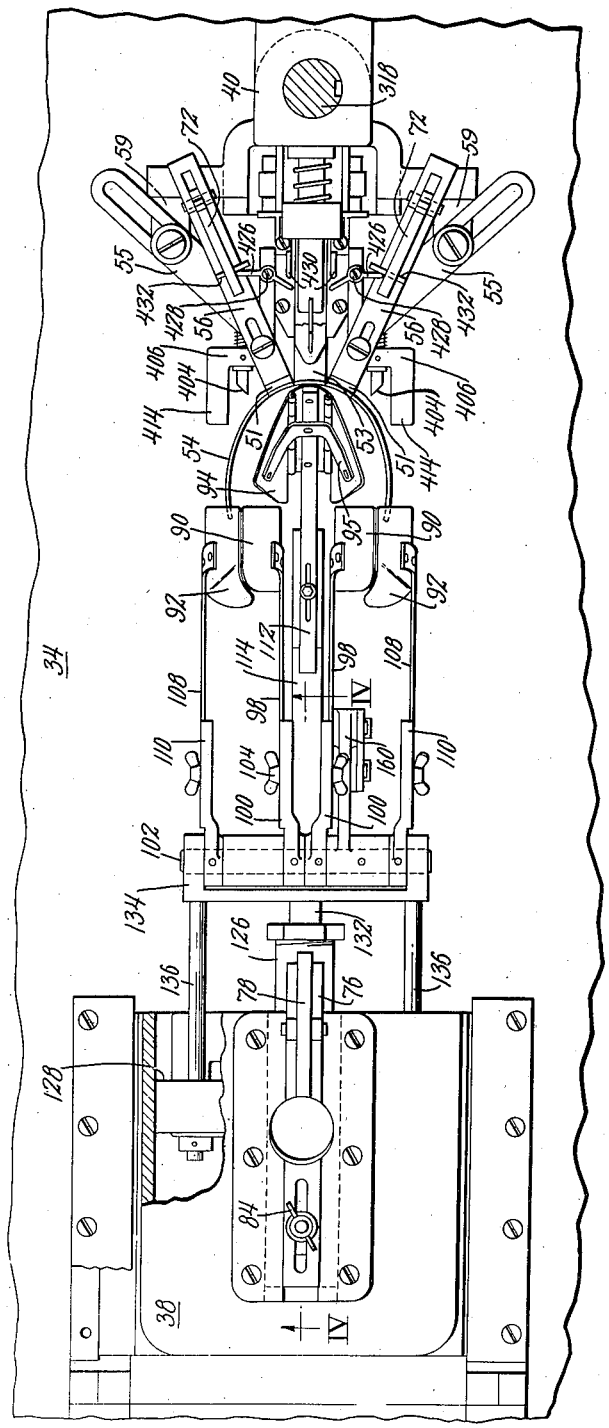

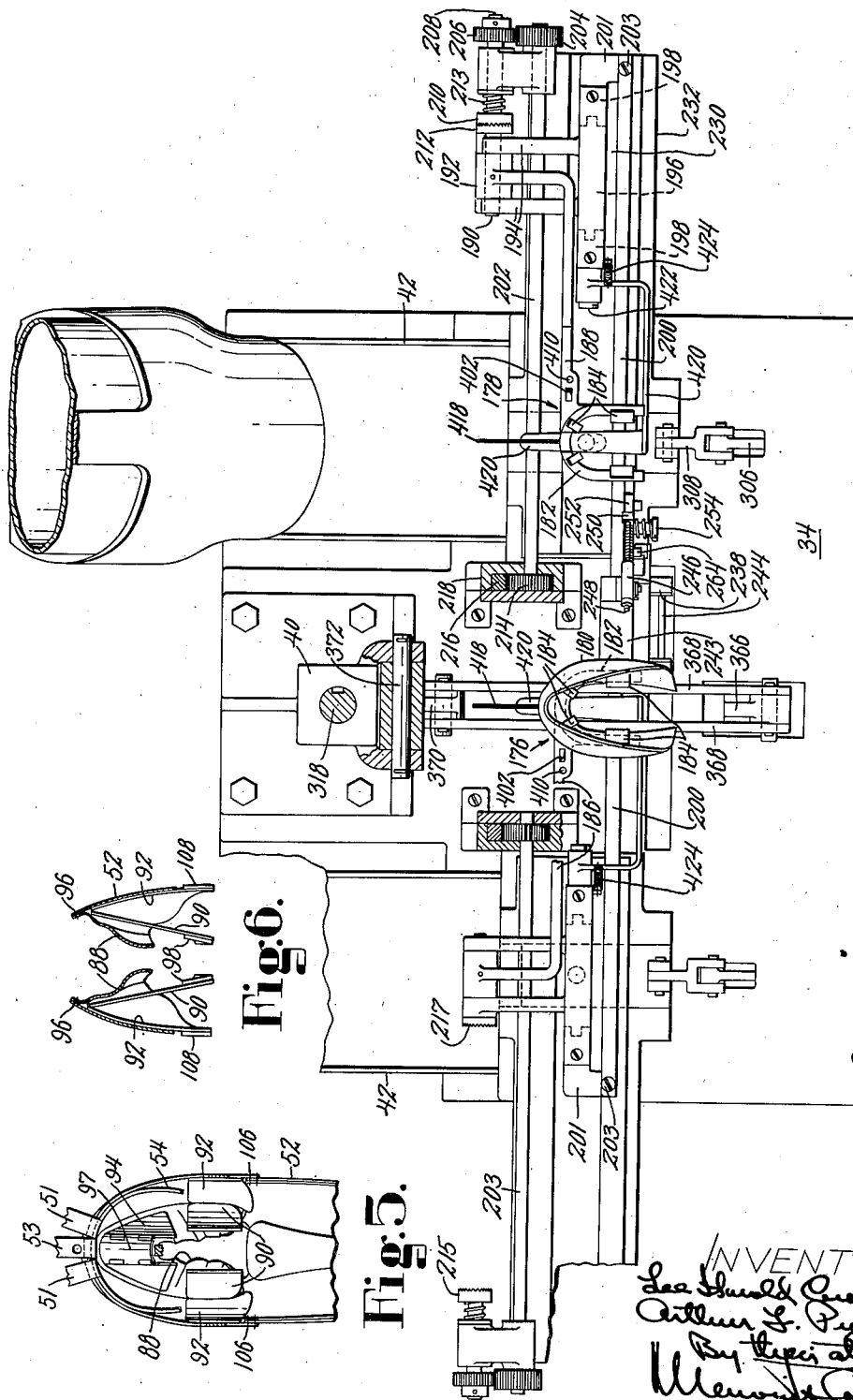

INVENTORS

Nov. 9, 1943.    L. H. CUSHMAN ET AL    2,333,708
ASSEMBLING MACHINE
Filed April 10, 1942    9 Sheets-Sheet 7

INVENTORS
Lee Harold Cushman
Arthur G. Pym
By Their Attorney

Nov. 9, 1943.   L. H. CUSHMAN ET AL   2,333,708
ASSEMBLING MACHINE
Filed April 10, 1942   9 Sheets-Sheet 9
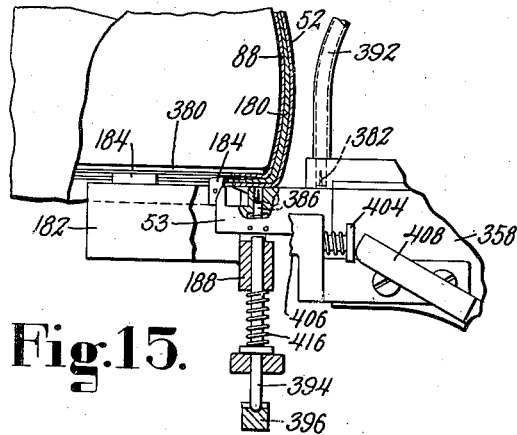
Fig. 15.
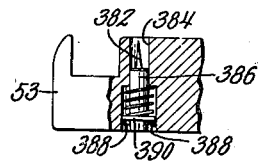
Fig. 16.
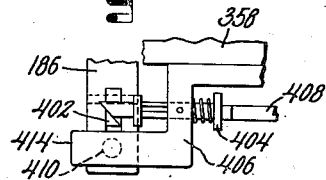
Fig. 17.
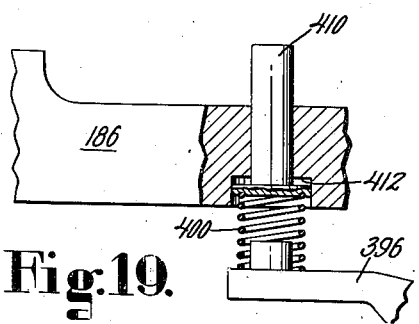
Fig. 19.
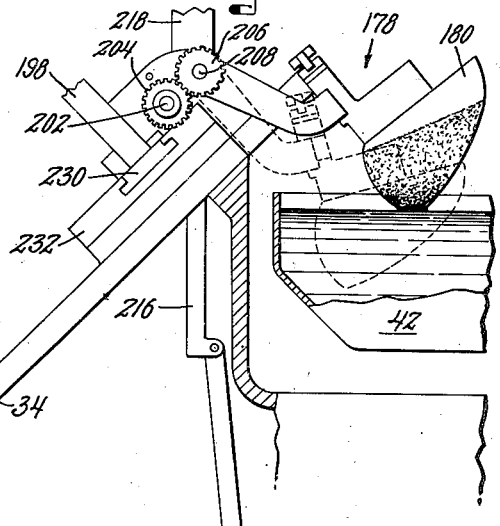
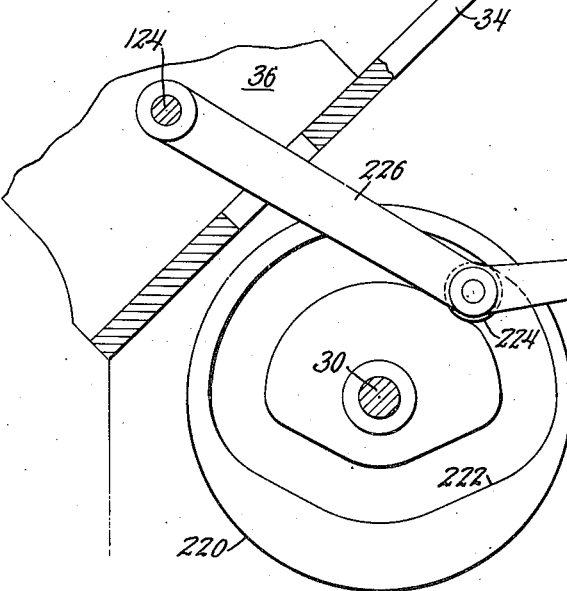
Fig. 18.
INVENTORS Patented Nov. 9, 1943

2,333,708

UNITED STATES PATENT OFFICE 2,333,708

ASSEMBLING MACHINE

Lee Harold Cushman, Hamilton, and Arthur F. Pym, Swampscott, Mass., assignors to United Shoe Machinery Corporation, Flemington, N. J., a corporation of New Jersey Application April 10, 1942, Serial No. 438,484

75 Claims. (Cl. 12—2)

This invention relates to shoe machines and is herein illustrated in its application to machines for assembling lined uppers and counters preparatory to the upper-shaping operations. In certain aspects, however, the invention is not limited to assembling machines but is applicable to other types of shoe machines.

In the commercial manufacture of shoes, it is the usual practice to apply cement to the counter by means of a machine which immerses the counter in liquid cement and then lifts it into a draining position where it remains until the operator manually removes the cement-treated counter and inserts it into a lined upper. The assembled upper and counter are then secured to an insole on a last bottom either manually or by means of a machine provided for that purposes. In the handling of cement-treated counters, the fingers of the operator will inevitably pick up more or less cement from the counter and transfer it to the outer surface of the upper from which it must be removed before packing the shoes. It is an object of the present invention to provide an assembling machine so organized that the operator will not be required to handle the cement-treated counter at all but will merely place the counter in dry condition on a suitable supporting means and position the upper in predetermined relation to the counter, the machine itself performing the counter-immersing and the assembling operations. The term "immerse" is to be construed broadly to include the dipping of a portion only of the counter into a body of liquid cement and also the movement of the entire counter beneath the surface of the liquid. It is another object of the invention to provide a machine which will accurately position the counter and the upper in a predetermined assembled relation to each other, thus eliminating to a large extent the possibility of error incidental to the manual assembling of uppers and counters. It is a further object of the invention to eliminate the requirement of skilled labor for the assembling operation by providing a machine which will automatically perform those steps in the operation which call for the exercise of skill when performed manually.

With the above objects in view, the present invention in one aspect thereof consists in the provision in a machine for assembling a counter and a lined upper, of means for effecting the immersion of a counter in liquid cement, and means for effecting relative movement of the cement-treated counter and a supported upper to assemble them together. For positioning the upper for the reception of a cement-treated counter, the illustrated machine is provided with novel means constructed and arranged to engage the adjacent surfaces of the upper and lining to space them apart from each other thereby to permit the assembly of the upper and counter without bringing them into contact with each other until they are substantially in assembled position.

In another aspect thereof, the present invention consists in the provision of means for supporting an upper comprising a plurality of members constructed and arranged to engage the bottom edge of the heel portion of an upper arranged in generally upright position, said members including a wiper which operates on the lasting margin of the heel portion of the upper, said upper-supporting members having means extending heightwise of the upper for engagement with the inner surface of the upper to arrange the upper to receive a counter. As herein illustrated, the means engaging the inner surface of the upper is substantially coextensive with the periphery of the heel portion of the upper and serves to hold the upper outspread sufficiently to permit a counter to move heightwise thereof into the upper without contacting its inner surface.

In accordance with a further feature of the invention, the upper-supporting members have mounted thereon a plurality of gripper members constructed and arranged to grip the bottom margin of the upper against said members which engage the inner surface of the upper. In order to provide for variation of the size of the bottom opening of the heel portion of the upper, the upper-supporting members are constructed and arranged for relative adjustment widthwise of the upper.

In accordance with a further feature thereof, the present invention consists in the combination with means for supporting a lined upper in a predetermined position in the machine, of a counter-holder operable to immerse the counter in liquid cement and to insert the cement-treated counter into the supported upper.

Another feature of the invention consists in the provision of counter-holder operating mechanism which, after immersing a counter in a body of liquid cement, lifts the counter into a predetermined draining position in which its lower extremity is in contact with the surface of the body of cement. Such contact of the counter with the cement accelerates the draining of the counter by reason of the action of the surface tension of the body of liquid cement on the free cement on the counter.

Novel features of the counter-handling means include mechanism for actuating the counter-holder to immerse the counter in liquid cement and to return the counter to loading position, and mechanism for actuating the counter-holder to insert the counter into the supported upper. The latter mechanism comprises means for moving the counter-holder heightwise of the upper and means operating during the latter part of said heightwise movement to move the counter heelwardly thereby to bring it into contact with the inner surface of the heel portion of the upper. In the illustrated machine, a movement of the counter widthwise thereof is required to advance it from its loading station into a position in alinement with the upper heightwise thereof from which position it is inserted into the upper. This position is hereinafter referred to as the counter-inserting station. To provide for the movements of the counter above defined, the counter-handling mechanism, in accordance with a further feature of the invention, comprises the counter-holder above referred to, a carrier for the counter-holder constructed and arranged for movement heightwise of the supported upper, a carrier-supporting member movable widthwise of the upper, and means on which said member is mounted for movement lengthwise of the upper. The illustrated machine is provided with automatic mechanism for effecting the movements of the counter-handling means above described in a predetermined time relation such that the cement-treated counter moves widthwise thereof from the counter-loading station to a position in alinement with the rear part of the upper heightwise thereof, then heightwise of the upper into a position adjacent to the bottom opening of the upper, then heightwise and heelwardly of the upper into assembled position.

In accordance with a further feature of the invention, the counter-immersing mechanism includes operating members which are brought into operating engagement with each other by movement of the counter-holder from its counter-inserting station into its counter-loading station.

In another aspect thereof, the present invention consists in the combination with means for supporting a lined upper in a predetermined position in the machine and means for inserting a counter into the upper, of means for laying the heel portion of the lining smoothly against the inner surface of the counter before inserting a last into the upper. For bringing the heel portion of the lining into contact with the upper, the illustrated machine is provided with a novel lining wiper constructed and arranged to act against the back-line portion only of the lining, the back line being a line on the upper, counter, or lining where it is intersected by a plane extending heightwise of the upper and passing through the longitudinal median line of the rear part of the shoe. In most types of shoes the back line of the upper is indicated by the juncture of the quarters at the back seam. In accordance with a further feature of the invention, the lining wiper is provided with actuating mechanism which causes said wiper to wipe the back-line portion of the lining heightwise of the upper from the top edge of the counter to the counter flange, then toewardly to the edge of said flange. In order to prevent dislocation of the lining during the retraction of the lining wiper, novel means is provided for causing the wiper to be retracted heightwise of the upper through a path spaced toewardly from the back-line portion of the lining.

In accordance with a further feature of the invention, the illustrated machine is provided with a cam member for directing the wiping movement of the wiper member in a path corresponding to the heightwise curvature of the back-line portion of the counter and means for directing the retracting movement of the wiper in a path spaced toewardly from the back-line portion of the lining.

In another aspect thereof, the present invention consists in the combination with means for effecting relative movement of a lined upper and a flanged counter to bring them into assembled relation to each other, of a wiper constructed and arranged to operate upon the lasting margin of an upper supported in the machine to wipe it against the flange of the counter, said wiper being adapted to receive a fastening and to carry said fastening into inserting position, and fastening-driving means rendered operative by the operation of the wiper for securing said upper and counter together. The illustrated machine is provided with a member for inserting said fastening, a latch for holding said fastening-inserting member retracted, an operating instrumentality, herein illustrated as the wiper above referred to, and means operable to actuate said instrumentality and to release said latch. The illustrated machine is provided with a novel fastening-inserting means characterized by its construction and arrangement for movement with the counter-holder into fastening-inserting position. The novel fastening-inserting means comprises a fastening-driving member, an actuator for said member, herein illustrated as a spring, means operated by the counter-inserting movement of the counter-holder for energizing said spring, and a latch operable to hold said fastening-driving member in retracted position until the fastening-inserting means has been advanced into fastening-inserting position.

In accordance with a further feature of the invention the fastening-inserting assembly includes means constructed and arranged to operate during the return movement of the counter-holder to retract the fastening-driving member and to reset the latch. The fastening-inserting member is operated upon release of said latch by means actuated by the wiper-operating mechanism. The novel counter-holder comprises a plate having the general outline of the heel-seat portion of a shoe bottom and means on said plate for holding a counter in determinate position thereon, said plate being provided with an opening through which the fastening-driving member operates to drive a fastening through the lasting margin of the upper and the flange of the counter.

The illustrated machine is so organized that it requires two cycles of operation to complete its work, one cycle being required for the counter-immersing operation and a second cycle for the remaining operations. To expedite the assembling operation the illustrated machine, in accordance with a further feature of the invention, is provided with two counter-holders and mechanism for operating one of said holders to immerse a dry counter in liquid cement and for operating the second counter-holder to insert a cement-treated counter into a supported upper. Further features of the invention relating to the duplex counter-carrying assembly above described comprise an organization whereby the counter-holders are moved in unison widthwise of the upper to transfer one counter-holder from counter-loading station to counter-inserting station while transferring the other counter-holder from counter-inserting station to counter-loading station; means for alternatively actuating said counter-holders to immerse a dry counter into liquid cement; means for alternatively actuating said counter-holders to insert a cement-treated counter into the supported upper; and an organization so constructed and arranged that the counter-immersing mechanism and counter-inserting mechanism are rendered operative on the counter-holders, respectively, by the holder-transferring movement above described.

In another aspect of the invention the illustrated machine is organized to provide two counter-loading stations, one for each counter-holder, and a central counter-inserting station common to the two holders and positioned in alinement with a supported upper heightwise thereof.

These and other features of the invention will now be described with reference to the accompanying drawings and pointed out in the appended claims.

In the drawings,

Fig. 1 is a right side elevation of a machine embodying our invention;

Fig. 2 is an enlarged detail view in side elevation illustrating the mechanism for supporting the rear part of an upper;

Fig. 3 is a plan view illustrating the upper-supporting mechanism;

Fig. 5 is a section on line V—V of Fig. 4;

Fig. 6 is a section on the line VI—VI of Fig. 4;

Fig. 7 is a plan view illustrating the counter-handling mechanism, certain parts being shown in section and other parts being broken away;

Fig. 15 is an enlarged detail view, partly in section, illustrating the means for releasing the tack driver;

Fig. 16 is a greatly enlarged detail view, partly in section, illustrating the end portion of the central heel-seat wiper and the tack-driving pin;

Fig. 17 is an enlarged detail view illustrating part of the tack-driving mechanism;

Fig. 18 is a side elevation, partly in section, illustrating the counter-immersing mechanism; and Fig. 19 is an enlarged fragmentary view, partly in section, illustrating part of the tack-driving mechanism.

Figure 4:
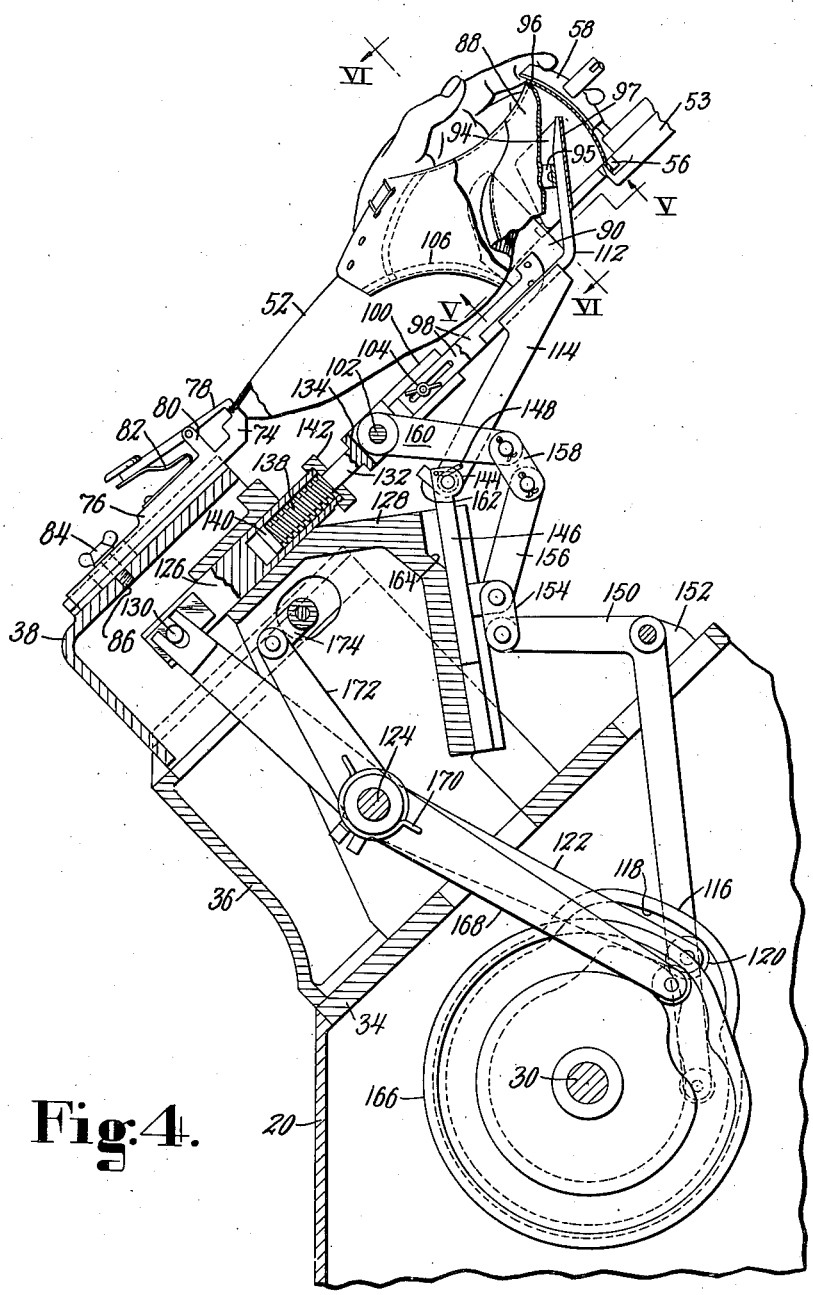
Fig. 4 is a side elevation partly in section on the line IV—IV of Fig. 3 showing an upper mounted in the machine, parts of the upper being broken away to reveal certain operating mechanism.

The machine illustrated in the drawings automatically immerses or dips a counter in a reservoir of liquid cement, inserts the cement-treated counter into the rear part of a lined upper which is supported in a predetermined position in the machine, then wipes the quarter lining smoothly into contact with the inner surface of the counter and, finally, secures the upper, counter, and lining to an insole on a last bottom by means of a tack positioned at the lower extremity of the back line of the upper. The last with the insole tacked to its bottom face is manually inserted into the upper during a rest position of the machine which follows immediately after the retraction of the lining-wiping means.

Inasmuch as two cycles of the machine are required to immerse the counter and insert it into the upper, the illustrated machine is provided with two counter-holders, one of which operates during a given cycle of the machine to immerse a dry counter, while the other operates concomitantly to insert a cement-treated counter into the upper. In order to obviate the requirement of a turret mechanism for transferring each counter-holder from its loading station to its immersing station and thence to its counter-inserting station, the illustrated machine is so organized that the two counter-holders move as a unit alternately to the right and to the left, in successive cycles of the machine, between a common, centrally-located counter-inserting station and two counter-loading stations located at opposite sides of the machine, said loading stations serving the two counter-holders, respectively. The transfer of a counter-holder from its loading station to its counter-inserting station occurs during the latter part of the machine cycle after the assembling operation has been completed. It will be understood that as one holder moves from its loading station to the counter-inserting station, the other counter-holder, which at that time is empty, moves concomitantly from its counter-inserting station to its counter-loading station ready to receive another dry counter.

Referring now to Fig. 1, the illustrated machine comprises a standard 20 having in its base an electric motor 22 which drives through a reducing gear a pulley shaft 24 connected by a belt 26 to a pulley 28 loosely mounted on a camshaft 30. The pulley 28 is operatively connected to the camshaft by a suitable clutch mechanism operated by a treadle 32. The machine cycle is divided into three parts, thus providing two stop positions the first of which permits the manual insertion of a last into the supported upper while the second stop permits the shoe to be removed from the machine before the operating parts are reset for a repetition of the machine cycle. In the upper extremity of the standard 20 is a top plate 34 which supports the work-supporting means and the operating instrumentalities and is arranged at an angle of about 45° to the horizontal so that the shoe may be placed in the position most advantageous for the operator. Secured to the forward portion of the top plate 34 is a head 36 in which a slide 38 is mounted for movement lengthwise of an upper supported in the machine. The slide 38 carries toe gripper mechanism hereinafter described. A standard 40 is secured to the rear portion of the top plate 34 and arranged to extend forwardly and upwardly at right angles to the top plate. Mounted on this standard are the mechanism for supporting the rear part of the upper and means for wiping the rear part of the lining heightwise of the upper from the top seam to the counter flange. Mounted on the top plate itself between the head 36 and the standard 40 is the counter-handling mechanism. For immersing counters positioned on the counter-holders, the illustrated machine is provided with two reservoirs, one of which is indicated by the numeral 42 in Fig. 1. Each reservoir is secured to a bracket 44 fastened to a shelf 46 extending inwardly from the back wall of the standard 20.

For supporting an upper in generally upright position, the illustrated machine is provided with a toe gripper and two upper-supporting members which engage the bottom edge of the heel portion of the upper, said members being constructed and arranged to act as the forward jaws of two gripper assemblies which grip the lasting margin of the upper at opposite sides of the back line and form with a central wiper member a substantially continuous support for the rear part of the upper. Referring to Fig. 2, each of the heel gripper assemblies comprises an upper-supporting member 51 which carries at its forward end an upper-spreading member herein illustrated as a curved band 54 which, as seen in Fig. 3, forms with the band in the opposite gripper assembly a line corresponding substantially to the periphery of the lasting margin at the heel portion of the upper, the central portion of said line being the upturned flange at the forward end of a central wiper member 53. For gripping the upper 52 against the band 54, each heel gripper is provided with a movable jaw herein illustrated as a sliding member 56 having a tongue-and-groove connection to the fixed member 51, said member 56 having gripper teeth formed in its forward end face. To provide for adjustment of each gripper assembly, the member 51 is secured to an arm 55 by a clamping screw 57, said arm 55 being bolted to a bracket 59 secured to a forward extension of the standard 40. Referring to Fig. 3, it will be seen that the arms 55 are slotted to provide for a considerable range of adjustive movement. As shown in Fig. 2, the rear part of the upper 52 is positioned heightwise thereof by supporting it by the edge of its lasting margin on the upper surfaces of the fixed gripper members 51 and the wiper 53, the general curvature of the rear part of the upper being maintained by drawing the upper forwardly against the convex surfaces of the bands 54.

The rear part of the upper is centered widthwise thereof in the machine by bringing the groove at the back-seam portion of the upper into registration with a curved gage plate 58 (Fig. 1) secured in the forward portion of a rod 60, splined in a bearing 62 for sliding movement lengthwise of the upper. The rod 60 is urged rearwardly to space the gage plate 58 away from the upper by a spring 64 surrounding the rod and confined between the bearing 62 and a head 66 at the end of the rod. To center the rear part of the upper widthwise thereof in the machine, the operator, after positioning the upper as shown in Fig. 2, takes hold of the gage plate 58 and draws it forwardly to its position illustrated in Fig. 4 in order to register the groove at the back seam with the forward edge of the gage plate. The upper 52 is held in its position illustrated in Fig. 2 by the gripper jaws 56 (Figs. 2 and 3) which engage the outer surface of the lasting margin of the upper and grip it against the band 54. Each gripper jaw is actuated by a spring 70 upon the release of a latch 72 by the manual operation of a trigger 73 extending upwardly from said latch. The latch 72 is pivoted in an upward extension 68 of the member 51 and arranged to engage the upstanding portion 432 of the gripper jaw. After the rear part of the upper has been secured in predetermined position in the machine, the operator takes hold of the toe portion of the upper and draws it toward him to tension the upper lengthwise and to insert the toe end of the upper between toe gripper jaws illustrated in Fig. 4. The lower stationary jaw 74 is an extension of a slide 76 mounted in a guideway in the top of the slide 38 for movement lengthwise of the upper. The upper jaw 78 is pivotally mounted between lugs 80 extending upwardly from the slide 76. The jaw 78 is normally held closed by a leaf spring 82 secured to the slide 76 and arranged to engage the forward end of the gripper jaw. To adjust the toe gripper jaws for operation on uppers of different sizes, the slide 76 is moved longitudinally in its guideway in the slide 38 and is secured in adjusted position by a wing nut 84 on a threaded stud 86 extending upwardly from the slide 38 through a slot in the slide 76.

In order to provide a space between the quarter lining 88 (Fig. 4) and the inner surface of the quarter portion of the upper into which a cement-treated counter may be inserted without danger of inadvertent contact with either lining or upper, the illustrated machine is provided with spacers for holding the lining and upper apart from each other during the counter-inserting operation, said spacers, as illustrated in Figs. 5 and 6, comprising inner guard plates 90 and outer guard plates 92 arranged at opposite sides of the quarter portion of the upper and a guard 94 (Fig. 4) positioned within the heel portion of the upper. The plates 90 and 92 in their operating position, as seen in Fig. 6, extend convergently heightwise of the upper from a point below the lasting margin of the upper to a point just below the top seam 96 where the plates come together. The guard 94, as seen in Fig. 5, comprises opposite side plates which extend convergently heelwardly and are hinged on an end portion 97 which, as seen in Fig. 4, extends upwardly and heelwardly, providing a space between the outer surface of said guard plate and the inner surface of the back-line portion of the upper into which the cement-treated counter may be inserted without danger of inadvertent contact with the back-line portion of the lining or the upper. The side plates of the guard 94 are normally held in their outspread position illustrated in Fig. 3 by a generally V-shaped resilient plate 95, the opposite ends of which are secured to said side plates respectively. This construction of the guard 94 permits it to move downwardly through an opening in a counter-holder hereinafter described which opening is substantially narrower than the width of the guard 94 in its normal outspread position. Each guard plate 90 is secured to an arm 98 (Figs. 3 and 4), said arms being adjustably secured to arms 100 fixed to a rockshaft 102. Referring to Fig. 4, each of the arms 98 is mounted in a suitable guideway in the arm 100 and is secured in adjusted position by a wing-headed screw 104. Preferably, the arms 98 are so adjusted that the guard plates 90 will be positioned slightly heelwardly of the seam 106 connecting the quarter of the illustrated upper to the vamp. In the operation of the machine, the guard plates 90 and 92 move toewardly at an early stage in the machine cycle bringing said plates into their position illustrated in Fig. 4, in which the toeward edge of each of the plates 92 engages the seam 106 thus creating a counter-receiving pocket extending the full length of the quarter portion of the upper. The outer guard plates 92 are secured to arms 108 which, as shown in Fig. 3, lie parallel to the arms 98 which support the inner guard plates 90. The arms 108 are adjustably secured to arms 110 fixed to the rockshaft 102. The guard plate 94 is secured to the upturned end portion of an angular bar 112 secured in the free end portion of an arm 114 and adjustable therein lengthwise of the supported upper. For moving the guard plates 90 and 92 toewardly, to open up the forward portion of the counter-receiving pocket, a cam 116 (Fig. 4) is secured to the camshaft 30, said cam having a groove 118 which receives a roll 120 at the lower end of a cam lever 122 freely mounted on a crossshaft 124. The upper end portion of the cam lever is bifurcated to receive the slabbed-off forward end portion of a shaft 126 slidably mounted in a bearing in an angular crosshead 128 in the head 36, the bifurcated upper end portion of the cam lever 122 being notched to receive a crosspin 130 extending through the slabbed-off end portion of the shaft 126. The rear portion of the shaft 126 is bored longitudinally to receive a rod 132 having at its rear end a crosshead 134 which provides a bearing for the rockshaft 102. In order to maintain the rockshaft in a horizontal position, the crosshead 134 is provided with forwardly extending parallel guide rods 136 (Fig. 3), the forward portions of said rods being slidably mounted in bearings in the crosshead 128. The cam lever 122 acts on the guard plate assembly through a spring 138 surrounding the rod 132 and confined between a head 140 at the forward end of said rod and a cap 142 on the rear end of the shaft 126. The guard plate 94 is mounted independently of the guard plates 90 and 92 for movement to and from operating position in a path common to the longitudinal line of the upturned portion of the bar 112 on which said guard plate is mounted. Thus, it will be seen that the guard plate 94 is withdrawn from the upper in a path extending heightwise of the upper with a toeward component, thus enabling the guard plate to clear the counter as it is retracted from the upper. As illustrated in Fig. 4, the arm 114 which carries the bar 112 is pivotally mounted between ears 144 at the upper extremity of a slide 146 mounted in a guideway in the crosshead 128. The arm 114 is yieldingly held in its position illustrated in Fig. 4 by a torsion spring 148. For actuating the slide 146, a bell crank lever 150 is fulcrumed at its elbow on a bracket 152 secured to the top plate 34 and operatively connected at its lower end to a cam on the shaft 30, a link 154 connecting the short arm of the bell crank lever to the slide 146. In retracting the guard plates 90, 92, and 94 from the upper, the side plates 90 and 92 are first moved heelwardly by the operation of the cam lever 122 and thereupon the bell crank lever 150 is actuated to impart downward movement to the slide 146. Such downward movement withdraws the guard plate 94 from the upper and acts through links 156 and 158 and an arm 160 secured to the shaft 102 to rock said shaft in a clockwise direction, as seen in Fig. 4, thereby withdrawing the side plates 90 and 92 from the counter portion of the upper. During the downward movement of the slide 146, a tail portion 162 on the arm 114 engages a cam surface 164 in the crosshead 128 to swing said arm downwardly into its position illustrated in broken lines in Fig. 10.

At an early stage in the operation of the machine, the upper 52 is placed under a light lengthwise tension by a forward movement of the slide 38 by the operation of a cam 166 (Fig. 4) fixed to the shaft 30, which cam operates an arm 168 freely mounted on the cross-shaft 124 and yieldingly connected by a torsion spring 170 to an arm 172 also freely mounted on said shaft, the upper end of said arm 172 being connected by a link 174 to the slide 38.

Figure 8:
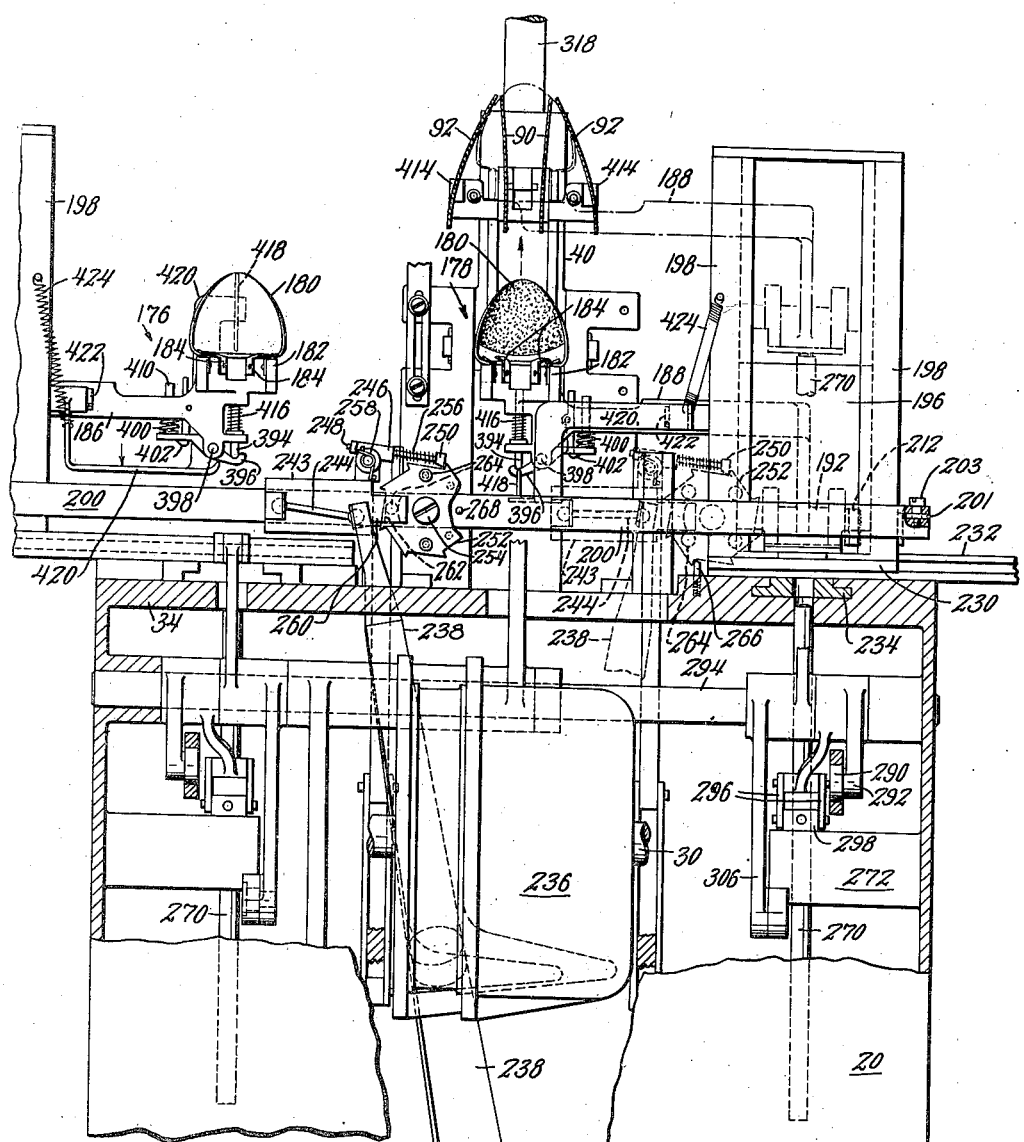
Fig. 8 is a section taken substantially on the line VIII—VIII of Fig. 1.
Figure 9:
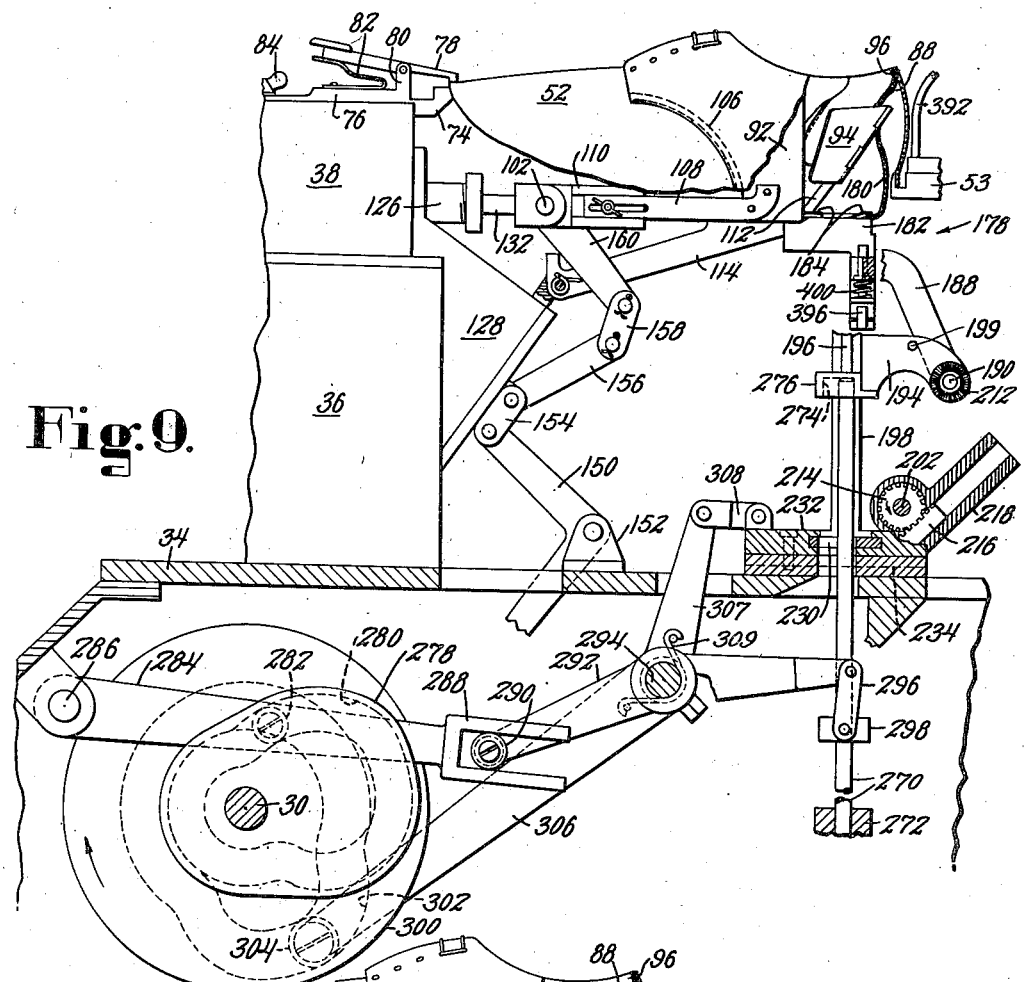
Fig. 9 is a sectional view taken in substantially the same plane as Fig. 4, illustrating particularly certain operating parts not included in Fig. 4.

For immersing counters and inserting them into uppers, the illustrated machine is provided with two counter-holders 176 and 178 (Fig. 7), a counter 180 being shown on the left-hand counter-holder 176 in said figure. The counter is supported by its flange on a narrow member 182 curved to the general shape of the flange of the counter and extending upwardly from the free end portion of an arm 186 which is actuated by means hereinafter described to immerse the counter and insert it into the supported upper. For holding the counter in determinate position on the member 182, four clips 184 are secured to said member and arranged to engage the upper surface of the counter flange and clamp it against the member 182. The counter-holding mechanisms being identical except for the fact that the arrangement of the arm 186 in one is the reverse of the other, a description of one of these mechanisms will suffice. Referring to the counter-holder 178 positioned at the right side of the machine, as shown in Fig. 8, the arm 188 extends from the member 182 horizontally to the right and then downwardly at a rearward inclination (Figs. 9 and 10) to a cross-shaft 190. Referring to Fig. 7, the cross-shaft 190 is fixed in a hub 192 projecting from the lower portion of the arm 188 and is journaled in parallel arms 194 extending rearwardly from a vertical slide or elevator 196 mounted between vertical guide plates or rails 198. In its position illustrated in Figs. 9 and 10, the arrangement of the counter-holder with relation to the arms 194 is maintained by a crosspin 199 fixed in said arms and arranged to support the arm 188. A similar elevator assembly is provided for the counter-holder 176, said assemblies being connected together for simultaneous movement widthwise of the machine by a link 200 the ends of which are connected respectively to brackets 201 secured to and extending forwardly from the outer rail 198 to provide for a pivotal movement of the link 200 on the brackets 201 when the counter-carrying assembly at one side of the machine is moved heelwardly of the supported upper, as hereinafter described. The connection of each end of the link 200 to its supporting bracket is effected by a screw 203 extending through an angular extension of the end portion of the link and into the bracket 201. In Fig. 8, the counter at the left is shown in its loading station and the cement-treated counter at the right is shown in counter-inserting station ready for upward movement into a supported upper. Referring to Fig. 7, the counter-holder 178 is actuated to immerse the counter in a body of liquid cement in the reservoir 42 by the rotation of a shaft 202 having fixed to its outer end a gear 204 which meshes with a gear 206 on a short shaft 208. At its left end the shaft 208 has fixed thereto a clutch member in the form of a crown gear 210 constructed and arranged for inter-engagement with a corresponding clutch member 212 on the shaft 190. When the clutch members 210 and 212 are in engagement with each other, as seen in Fig. 7, the corresponding clutch members 215 and 217 at the left side of the machine are spaced apart from each other. Consequently, in the arrangement of the counter-handling mechanism, illustrated in Fig. 7, the shaft 202 will actuate the counter-holder 178 to immerse the counter mounted thereon while the corresponding shaft 203 at the opposite side of the machine rotates idly. It will be understood that the clutch members 210 and 212 are brought into clutching engagement, as seen in Fig. 7, by a movement of the counter-handling assembly to the right. To take the shock of the engagement of the clutch member 210 by the travelling clutch member 212, a spring 213 is loosely mounted on the shaft 208. Inasmuch as the clutch member 212 travels with the counter-holder 178 during its counter-inserting movements heightwise of the upper and heelwardly thereof, the return movement of the counter-holder must locate the holder in a predetermined position in which the shaft 190 which carries the travelling clutch member 212 is alined accurately with the shaft 208 which carries the clutch member 210. Such alinement is effected by moving the counter-holder slide 196 (Fig. 8) downwardly into a predetermined low position and moving the right-hand counter-handling assembly into a predetermined forward position by actuation of mechanism hereinafter described. For rotating the shaft 202 to immerse the counter, a gear 214 fixed to the left end of the shaft 202 meshes with a rack 216 mounted in a guideway in an inclined bracket 218 (Fig. 9). The rack 216 is actuated by a cam 220 (Fig. 18) on the shaft 30, said cam having a groove 222 in which travels a roll 224 on a cam lever 226 the forward end of which is freely mounted on the shaft 124 and the rear end of which is connected by a link 228 to the rack 216. In the operation of the cam 220, the counter 180 is swung rearwardly and downwardly into its immersed position indicated by broken lines in Fig. 18. After immersion, the counter is lifted by the operation of the cam 220 into its draining position illustrated by full lines in Fig. 18. In this position, the then lower extremity of the counter is in contact with the liquid in the reservoir and remains in that position during the greater part of the machine cycle while the counter drains. By maintaining contact of the counter with the liquid in the reservoir, the draining of the counter is accelerated by the surface tension of the liquid. During the latter part of the machine cycle, the counter-holder is swung in a counterclockwise direction, as seen in Fig. 18, to return the counter to its loading position. As shown in Fig. 18, when the counter is in its immersed position, the greater part of the counter wings and the entire counter flange are above the surface of the cement. It will be understood that by adjusting the vertical position of the reservoir 42 (Fig. 1) on the bracket 44, any degree of immersion or a total immersion of the counter may be obtained.

In the illustrated machine, the mechanism shown in Fig. 18 is duplicated, one such mechanism being provided for each of the counter-holders 176 and 178. It will be understood, however, that only one of these mechanisms actuates its counter-holder during a given cycle of the machine because when one pair of clutches 210, 212 (Fig. 7) are in engagement, the clutch members at the opposite side of the machine are separated from each other and therefore the counter-inserting mechanism at said opposite side of the machine operates idly during that cycle.

Immediately upon the return of the cement-treated counter to its loading position, the counter-holder is transferred from counter-loading station to counter-inserting station for insertion of the counter into a supported upper in the next succeeding operation of the machine. This counter-transferring movement occurs after the counter-inserting operation has been completed, and the assembled shoe has been removed from the machine and the empty counter-holder has been moved downwardly into its lower elevation. In the course of the counter-transferring movement, the entire counter-handling assembly is moved as a unit, said assembly comprising the empty counter-holder, the counter-holder in which is mounted the recently immersed counter, and the rails 198 which control the elevation of the respective counter-holders. To provide for such transferring movement, each pair of rails 198 is secured to a slide or carrier 230 (Fig. 8). Each carrier 230 is slidably mounted for movement widthwise of the machine in a guideway in a plate 232 which is movable from front to back of the machine in the top plate 34 in the performance of a function hereinafter described, said plate 232 having a downwardly extending T-shaped tongue 234 slidably mounted in an under-cut groove in the top plate. For effecting the transferring movement, a cam 236 on the shaft 30 is constructed and arranged to actuate a lever 238 mounted for rocking movement on a shaft 240 mounted in bearings in standards 242 (Fig. 1) in the base of the machine. In successive cycles of the machine, the counter-handling assembly in effecting the counter-transferring movement moves alternately to the right and to the left. In each cycle of the machine, however, the cam lever 238 which effects such transferring movement, moves from its full-line position in Fig. 8 to its broken-line position and then back to its full-line position again. Thus, it will be seen that the actuating movement of said cam lever must take place on its advancing stroke and its return stroke alternately in successive cycles of the machine. In order to accomplish this result, the machine is provided with the mechanism now to be described. Slidably mounted on the link 200 is a plate 243 which is connected to the upper extremity of the cam lever 238 by a link 244. Pivoted between ears extending upwardly from said plate is a pawl comprising a member 246 and a pin 248 slidably mounted in a bore in said member and provided with a head 250 constructed and arranged to act against the teeth of a ratchet wheel 252 pivoted on a headed screw 254 in the link 200. A spring 256 surrounding the pin 248 holds the head of the pawl in operating position while permitting it to yield as required in the operation of the machine. A torsion spring 258 yieldingly holds the head of the pawl in ratchet-engaging position. The plate 243 has an extension 260 which is grooved vertically at 262 to receive any one of a plurality of pins 264 projecting from the front face of the ratchet wheel 252. The illustrated ratchet wheel is provided with four such pins uniformly spaced about the periphery of the wheel and is provided with twice as many ratchet teeth as pins. In the operation of the machine, the cam lever 238 swings to the right, as seen in Fig. 8, from its full-line position to its dotted-line position to transfer the counter-carrying assembly from its position illustrated in Fig. 8 to a position in which the counter-holder 170 will be located in counter-inserting station. As the cam lever approaches its dotted-line position, the then lowermost tooth of the ratchet wheel 252 engages a spring-pressed pin 266 extending upwardly from the top plate 34 and the ratchet wheel turns in a clock-wise direction ⅛ of a revolution, or the distance between two teeth, thereby disengaging the pin 264 at the left of the ratchet wheel from the plate 243 to enable said plate to return to its initial position without carrying the counter-handling assembly with it. In the next succeeding operation of the machine, the cam lever 238 swings idly to the right into its dotted-line position illustrated in Fig. 8. As said lever moves to the right, the ratchet wheel 252 is in its dotted line position with the pins 264 so arranged that the extension 260 of the sliding plate 243 moves into the space between the two pins 264 at the left of the ratchet wheel. As the slide 243 approaches the limit of its movement to the right into its dotted-line position, the head of the pawl engages a tooth of the ratchet wheel, the spring 256 compressing until the groove 262 in the extension 260 comes into alinement with the lower left pin 264 whereupon said spring expands causing the pawl to turn the ratchet wheel 45° to advance said pin into said groove thereby to connect the slide 243 to the counter-handling assembly. It will be understood that upon its return movement, the cam lever will carry the counter-handling assembly with it, transferring said assembly to its position in Fig. 8. For preventing movement of the ratchet wheel from any other cause than its engagement by the pin 266 or the pawl 250, the link 200 is provided with an invisible latch member herein illustrated as a spring-pressed ball 268 (Figs. 8 and 14) arranged to be seated alternatively in a plurality of sockets in the ratchet wheel.

Figure 10:
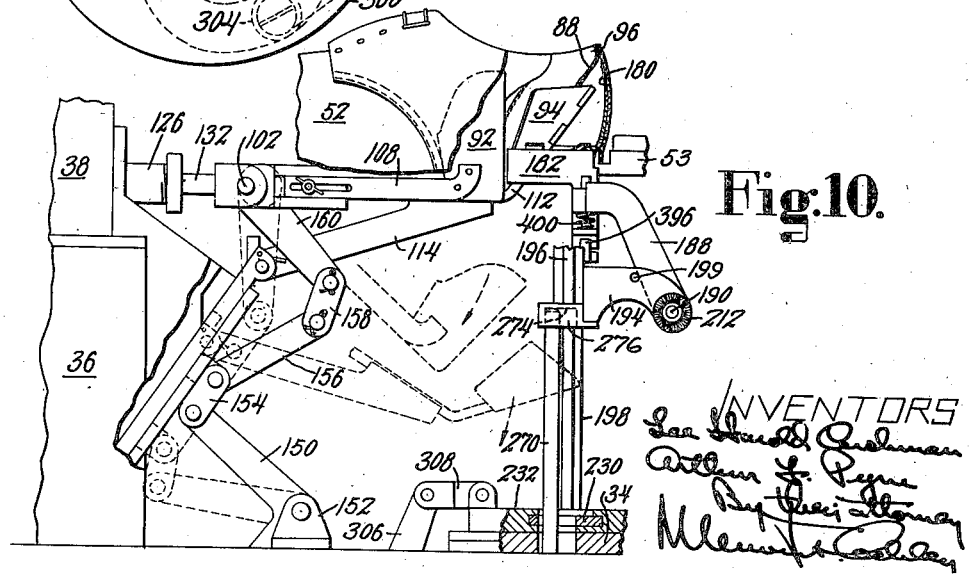
Fig. 10 is a sectional view, similar to Fig. 9, showing the operating parts at a different stage in the machine cycle.

In moving the cement-treated counter upwardly into the rear portion of the supported upper, the counter is first moved heightwise of the upper from its position illustrated in Fig. 8 to its position in Fig. 9 and then is moved simultaneously heightwise and heelwardly of the upper from its position illustrated in Fig. 9 into its position in Fig. 10, in which it is located in its predetermined assembled position within the upper. For effecting movement of the counter heightwise of the upper, the illustrated machine is provided with two elevator shafts 270 (Fig. 8), one such shaft being provided for each elevator 196. Referring to Figs. 9 and 10 illustrating the mechanism for actuating the right-hand elevator, the illustrated elevator shaft 270 is slidably mounted in a fixed bearing 272 and arranged to extend upwardly through the top plate 34 and through suitable openings in the plate 232 and the slide 230 and thence upwardly between the rails 198 and into engagement within a recess 274 in a plate 276 secured to the lower extremity of the slide 196, the recess 274 being extended lengthwise of the upper to provide for the movement of the counter-holder heelwardly of the upper. For actuating the elevator shaft 270 a cam 278 is fixed to the shaft 30, said cam having a groove 280 within which travels a roll 282 carried by a lever 284 arranged to swing on a fixed fulcrum 286. At its free end, the lever 284 has a fork 288 which engages a roll 290 at the forward end of a lever 292 fulcrumed on a cross shaft 294 and connected by a pair of links 296 to a collar 298 on the shaft 270. For moving the counter heelwardly of the upper as it travels from its position illustrated in Fig. 9 to its position in Fig. 10 the illustrated machine is provided with two cams and connections therefrom to the two slides 232. Referring to Fig. 9 illustrating the cam assembly at the right side of the machine, a cam 300 fixed to the shaft 30 has a groove 302 in which travels a roll 304 at the forward end of an arm 306 freely mounted on the shaft 294 and yieldingly connected by a torsion spring 309 to a short arm 307 which in turn is connected by a link 308 to the slide 232, which, it will be remembered, is slidably mounted in an upward extension of the top plate 34 for movement lengthwise of the upper. The yielding connection between the arm 306 and the arm 307 enables the counter 180 to follow the course of least resistance in its movement upwardly and heelwardly from its position in Fig. 9 to its position in Fig. 10. The yielding connection between said arms also makes it possible for the cam 300 to operate idly in alternate cycles of the machine when the clutch member 212 is in engagement with the clutch member 210, as shown in Fig. 7. It will be understood that when said clutch members are in engagement they themselves will prevent any movement of the slide 232 and, consequently, the movement of the arm 306 by the cam 300 will be taken up by the torsion spring. It will be understood that during the forward or return movement of the slide 232, the cam 300 acts positively on said slide through the arms 306 and 307 bringing the clutch member 212 into a predetermined position such that downward movement of the counter-elevating slide 196 will bring the clutch shaft 190 into alinement with the shaft 208 (Fig. 7) which carries the clutch member 210.

Figure 12:
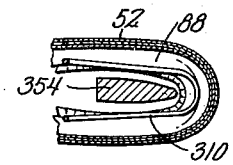
Fig. 12 is a section on the line XII—XII of Fig. 11.
Figure 13:
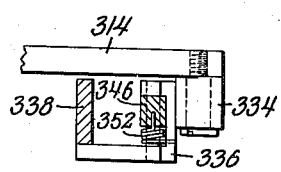
Fig. 13 is an enlarged view in section on the line XIII—XIII of Fig. 11.
Figure 11:
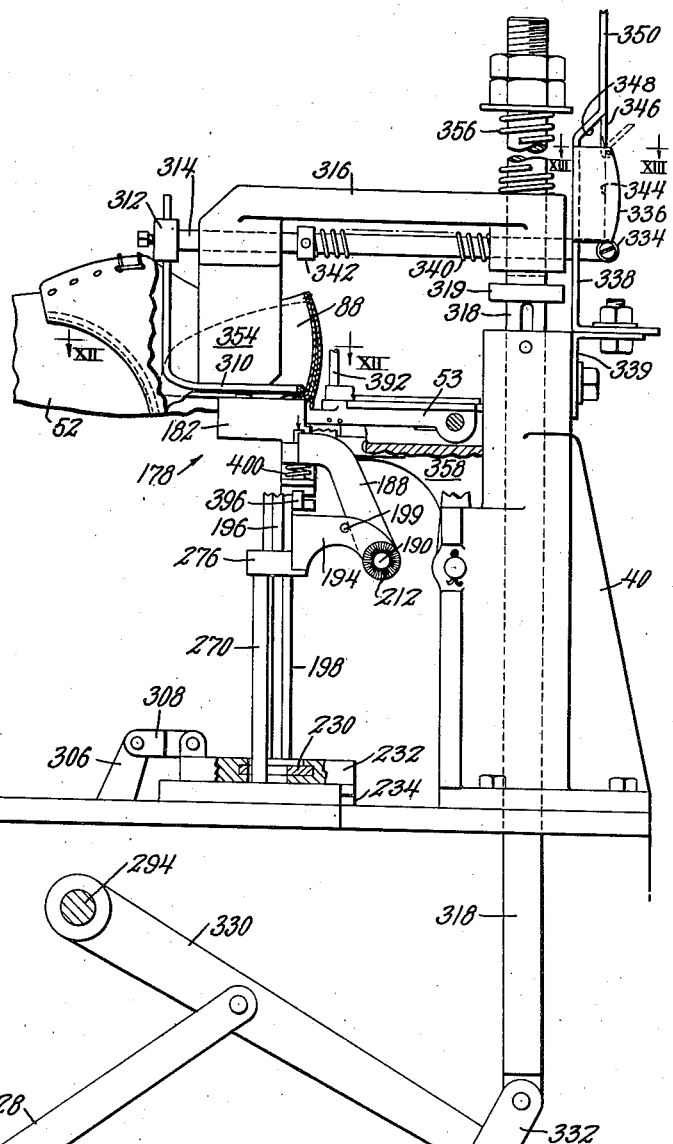
Fig. 11 is a side elevation, partly in section, illustrating particularly the lining-wiping mechanism.

After the counter has been inserted into the upper (Fig. 10), the guard plates 90, 92, and 94 which provide a space between the upper and the lining through which the counter may be inserted into the upper, having performed their function, are swung downwardly into the broken-line position illustrated in Fig. 10 to permit the rear or back-line portion of the lining to be wiped heightwise of the upper against the inner surface of the counter. For performing the lining wiping operations, the illustrated machine is provided with a wiper member in the form of a relatively rigid wire 310, illustrated in Figs. 1, 11, and 12. As illustrated in Fig. 12, the lining wiper is a generally U-shaped member the side portions of which are close enough together to allow the wiper to enter the heel part of the upper through its ankle opening with ample clearance at opposite sides of the upper while the curved heel-end portion of said wiper engages the back-line portion of the lining and wipes it downwardly against the inner surface of the counter. As illustrated in Fig. 11, the forward portions of the lining wiper member 310 are bent upwardly and secured in a crosshead 312 at the forward end of a sliding shaft 314 mounted in bearings in an arm 316 splined on a sliding shaft 318 splined in a bore in the standard 40. When the machine is in its rest position, illustrated in Fig. 1, the arm 316 is supported on a flange 319 of the shaft 318, said arm being yieldingly held in contact with the flange by a spring 356 surrounding the upper portion of said shaft. As the lining wiper member comes to the limit of its down-wiping movement, the flange 316 moves away from the arm 316 and the spring 356 applies a light pressure to the lining wiper which is maintained during its wiping movement toewardly of the upper. For actuating the lining wiper a cam 320 is secured to the shaft 30, said cam having a groove 322 in which travels a roll 324 carried by a lever 326 loosely mounted on the shaft 124. The free end of the lever 326 is connected by a link 328 to a lever 330 freely mounted on the shaft 294 and connected by a link 332 to the lower end of the sliding shaft 318. During the downward movement of the shaft 318, the shaft 314 slides lengthwise of the upper to cause the lining wiper to travel in a path which follows the heightwise curvature of the backline portion of the upper. Such sliding movement of the shaft 314 is directed and controlled by the engagement of a roll 334 on the rear end of the shaft 314 (Figs. 11 and 13) with the outer or convex surface of a cam member 336 extending rearwardly from a bracket 338 adjustably secured to a bracket 339 fixed to the upper portion of the standard 40. As illustrated in Fig. 13, the roll 334 engages an inwardly flanged portion of the cam member 336, the roll being held against said cam member by a spring 340 (Fig. 11) surrounding the shaft 314 and confined between a collar 342 on said shaft and the hub of the arm 316. As the lining wiper 310 comes to the limit of its movement heightwise of the upper, the roll 334 rides off the convex surface of the cam member 336 and the spring 340 moves the lining wiper toewardly of the upper wiping the bottom margin of the lining inwardly over the flange of the counter. The forward movement of the wiper 310 is arrested by the engagement of the roll 334 with the bracket 338 which serves as a rail for directing the return movement of the wiper-carrying shaft 314. Upon the completion of the forward movement of the lining wiper, the cam 320 operates to move the wiper upwardly out of the heel portion of the upper. During the upward movement of the lining wiper, it remains in its forward position out of contact with the lining and, consequently, the wiper cannot misplace the lining during its retraction. During the upward movement of the wiper, the roll 334 travels upwardly on the rear surface of the bracket or rail 338 between said bracket and the forward surface 344 of the fixed cam member 336. In the course of its upward movement, the roll 334 engages a gate 346 and swings it open as it travels from the inclined surface 348 of the bracket to the surface 350 extending upwardly beyond said gate. As the roll 334 moves out of contact with the gate, said gate is closed by a torsion spring 352 (Fig. 13) so that said roll during its downward movement will pass over the rear surface of said gate which serves to direct the roll to the convex surface of the cam member 336.

Figure 14:
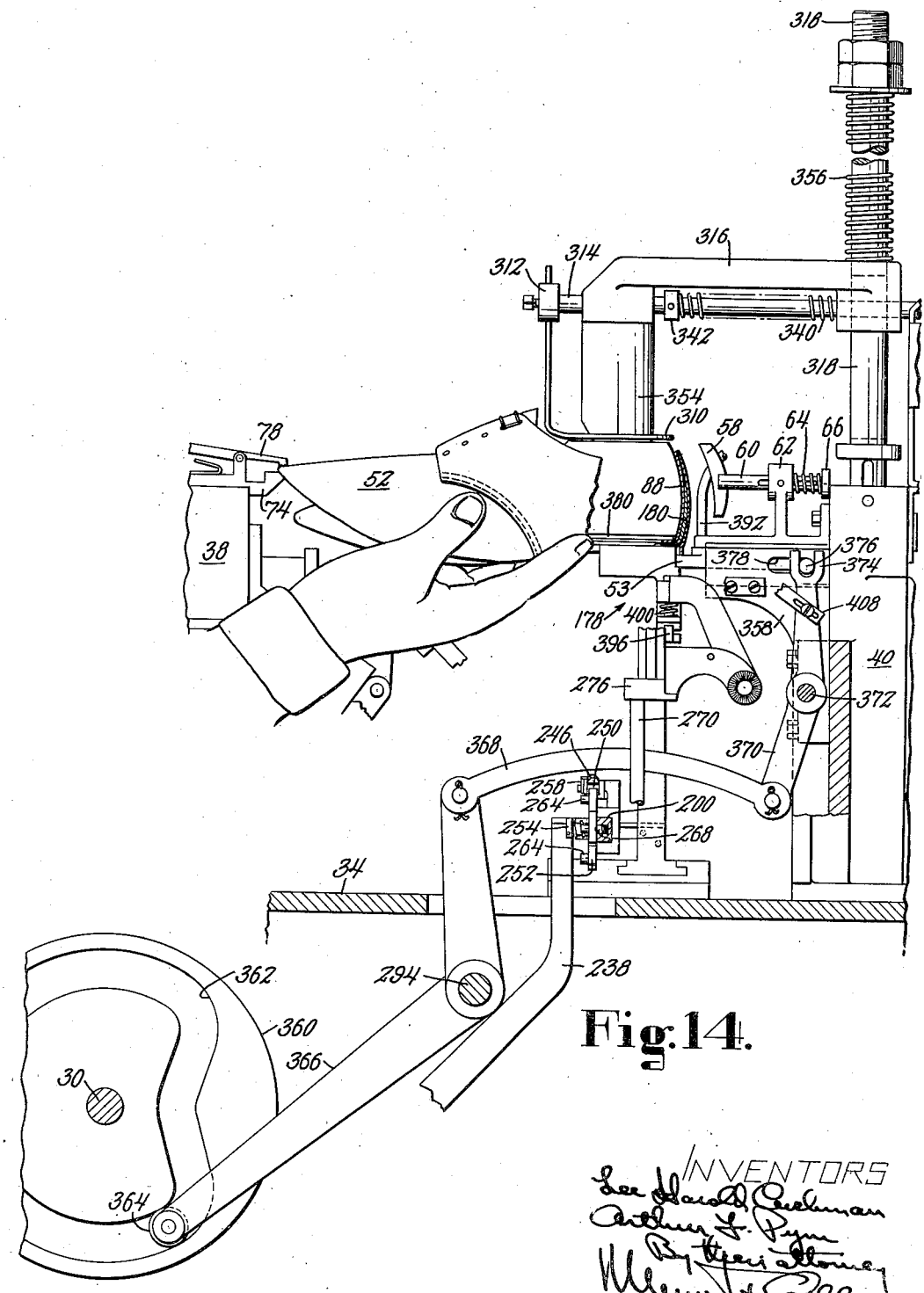
Fig. 14 is a side elevation, partly in section, illustrating particularly the last holddown mechanism and the upper-wiping mechanism.

After the lining wiper has been retracted, the machine stops in order to permit the operator to insert a last into the supported upper. The last is preferably inserted from the toe end of the upper, the toe gripper jaws 74 and 78 being disengaged from the upper to enable the operator to lift up the forepart of the upper to bring it into position to receive the last. When the toe gripper jaws are disengaged from the upper, they are moved forwardly by the torsion spring 170 (Fig. 4) into a position in which they will not seriously interfere with the positioning of the last in the upper. Having inserted the last into the upper, the operator again starts the machine. During the remaining portion of the machine cycle, the lasting margin of the back-line portion of the upper is wiped in under the flange of the counter and the wiped-in margin together with the flange of the counter and the margin of the lining is tacked to an insole on the last bottom. For holding the last against upward movement during the wiping and tacking operations, the arm 316 has a downward extension 354 which is brought into engagement with the cone portion of the last by a second actuation of the sliding shaft 318 (Fig. 14). In order to hold the last firmly against its support, the shaft 318 continues to move downwardly after the holddown has engaged the last compressing the spring 356 on said shaft and applying pressure to the arm 316. The wiping operation is performed by the wiper member 53 which is slidably mounted in a suitable guideway in a bracket 358 secured to the standard 40. In the course of the wiping operation, the wiper moves forwardly from its position in Fig. 14 to its position illustrated in Fig. 15, the counter-holder being recessed to receive the forward portion of the wiper. For operating the wiper, a cam 360 is secured to the shaft 30, said cam having a groove 362 in which travels a roll 364 at the lower end of a bent cam lever 366 freely mounted on the shaft 294. The upper end of the cam lever is connected by a link 368 to a lever 370 fulcrumed on a crosspin 372 extending between forward extensions of the standard 40. The upper portion of the lever 370 is provided with a fork 374 which engages a pin 376 extending from the rear portion of the wiper through a slot 378 in the bracket 358. For securing the lasting margin of the upper together with the flange of the counter and the bottom margin of the lining to an insole 380 on the last bottom, the wiper carries an inverted tack 382 (Fig. 16) in a bore 384, the tack being supported on the upper end face of a pin 386 mounted in said bore and supported by pins 388 which engage a flange 390 at the lower portion of the pin. The tack is fed to the wiper plate from any suitable source through a tube 392 (Fig. 15). For driving the tack, each counter-holder is provided with a driving pin 394, said pins being mounted respectively in the arms 186 and 188 (Fig. 8). For actuating the driving pin each of said arms has a lever 396 fulcrumed at 398 between downward extensions of the counter-carrying arm, said lever being actuated by a spring 400. The driving of the tack is timed by the release of a latch 402, the hooked end portion of which engages the bottom surface of the lever 396. For releasing said latch a headed pin 404 (Figs. 15 and 17) is splined in a bracket 406 secured to the bracket 358 and is beveled at its forward end to exert a cam action on the complementally beveled upper end portion of the latch 402. For actuating the pin 404, a finger 408 is secured to the upper portion of the wiper-actuating lever 370 (Fig. 14) and arranged to engage the head of said pin. The spring 400 which actuates the tack-driving lever 396 is energized by the operation of a plunger 410 (Fig. 19) mounted in the counter-carrying arm. It will be understood that there are two such plungers, one in the arm 186, illustrated in Fig. 19, and the other in the arm 188. The head of the plunger is mounted in a counterbore 412 in the arm 186 and is concentrically grooved to receive the spring 400. When the counter-holder is in its lowermost position, illustrated in Fig. 8, the spring and plunger are positioned as shown in Fig. 19, the spring being in its expanded position. During the latter part of the upward movement of the counter-holder, the upper end of the plunger engages a forward extension 414 (Fig. 17) of one of the brackets 406 causing a relative movement of the plunger and the arm 186 which compresses the spring 400 to energize it for the tack-driving operation. During the downward movement of the counter-holder, after the tack has been driven, the plunger 410 moves away from the extension 414 releasing the pressure of the spring 400 against the tack-driving lever 396. Thereupon, a light spring 416 (Fig. 15) surrounding the tack-driving pin 394 moves said pin downwardly to restore the lever 396 to its position illustrated in Fig. 8 in which it is held against tack-driving movement by the latch member 402. During the return movement of the tack-driving lever by the spring 416, the tack-driving spring 400 together with the plunger 410 move upwardly as a unit into their position illustrated in Fig. 19.

In the operation of the machine, a dry counter is mounted on that counter-holder which is located in counter-loading position, that being the position of the counter-holder 176 in Fig. 8. The operator puts the machine through its cycle of operations without first positioning an upper therein, this first cycle serving merely to cause the counter to be treated with cement. Upon the completion of the first cycle of the machine, another dry counter is mounted on the counter-holder 178 which at that time is located in counter-loading position and an upper is mounted in the machine for assembly with the cement-treated counter in the next succeeding cycle of the machine. For centering the back line of the counter 180 upon the counter-holder, the illustrated machine is provided with a gage plate 418 (Fig. 1), the concave gaging edge of which has a curvature complemental to the heightwise curvature of the back-line portion of the counter. In the molded counter, the back line is identified by a thin rib or fin formed in the convex surface of the counter by the molding machine. In centering the counter on the holder, the counter is so located that said rib registers with the gage plate 418 when said plate is swung upwardly from its position in Fig. 1 into its gaging position illustrated in Fig. 8. It will be understood that there are two such counter gages in the illustrated machine, one for each counter-holder. The illustrated gage plates is secured to a bent arm 420 the outer extremity of which is pivoted at 422 on the inner guide plate 198. The gage plate is normally held in retracted position by a spring 424 extending from the horizontal portion of the arm 420 to the guide plate 198. In Fig. 8, the gage plate associated with the counter-holder 176 is shown in counter-gaging position while the gage plate associated with the counter-holder 178 is in retracted position. After the operator has located the counter centrally on the counter-holder, the clips 184 which hold the flange of the counter against the plate 182 will maintain the central position of the counter during its immersion and during the assembly of the counter and the upper.

For centering the back line of the upper with relation to the upper-supporting devices, the gage plate 58 is drawn forwardly from its position in Fig. 14 to its gaging position illustrated in Fig. 4. In most uppers, the back line is identified by a slight groove formed by the back seam in the outer surface of the upper and the upper may readily be centered relatively to the supporting devices by bringing the gage plate 58 into registration with said groove. After so centering the back line of the upper, the gripper jaws 56 are manually released to grip the lasting margin of the upper against the band 54. The upper is then manually tensioned lengthwise and its toe portion is inserted between the gripper jaws 74 and 78. The operator then depresses the treadle 32 to start the power cycle of the machine. During the first part of the machine cycle, the dry counter is swung rearwardly and downwardly into its immersed position illustrated by dotted lines in Fig. 18 and is then moved upwardly into its draining position illustrated by full lines in said figure. Concomitantly with the immersion of the counter, the cement-treated counter is moved upwardly from its full-line position illustrated in Fig. 8 to its dotted-line position therein by the operation of the right-hand elevator shaft 270. During the latter part of its upward movement, the counter is moved heelwardly from its position in Fig. 9 to its position in Fig. 10 by the operation of the cam lever 306 on the plate 232 which carries the counter-supporting assembly. After the counter has been seated against the inner surface of the back-line portion of the upper, as shown in Fig. 10, the cam 166 (Fig. 4) actuates the slide 38 which carries the toe gripper assembly thereby tensioning the upper lengthwise thereof and drawing the heel portion of the upper firmly into contact with the outer surface of the supported cement-treated counter and thus bonding the upper and counter together. Substantially concomitantly with the upper-tensioning operation the plates 90, 92 and 94 which hold the upper and lining spaced from each other to receive the counter are swung downwardly into their respective dotted-line positions illustrated in Fig. 10. The lining wiper 310 (Figs. 11 and 12) then moves downwardly into the upper following the heightwise curvature of the back-line portion of the upper and wiping the lining downwardly against the inner surface of the rear portion of the counter and then toewardly against the counter flange. The lining wiper is then withdrawn upwardly from the upper whereupon the machine stops to enable the operator to insert a last into the upper. Preferably, the last is inserted heel foremost through the toe portion of the bottom opening of the upper, the toe end of the upper being first disengaged from the grippers 74, 78 and lifted upwardly to receive the last. After setting the heel portion of the last firmly against the rear portion of the lining, the operator again depresses the treadle 32 while manually holding the last in position in the upper. The last holddown 354 now moves downwardly into its position illustrated in Fig. 14 to grip the rear part of the last against the inwardly-extending margin of the lining and then the wiper member 53 advances from its position in Fig. 14 to its position in Fig. 15 to wipe the back-line portion of the lasting margin of the upper against the flange of the counter. During the latter part of the advancement of the wiper member, the gripper jaws 56 (Figs. 2 and 3) are withdrawn into their latched open position illustrated in Fig. 2 by the actuation of short levers 426 (Fig. 3) mounted on fixed fulcrums 428 and so arranged that their inner ends are engaged by plates 430 secured to the wiper member while their outer ends are arranged to act on upturned end portions 432 of the gripper jaws. Upon the completion of the advancement of the wiper member, a tack is driven by the operation of the pin 394 (Fig. 15) through the upper counter, lining and insole and clenched against the heel plate on the last bottom to secure the parts in assembled position. The machine then stops to permit the operator to remove the shoe from the work supports by a heelward movement of the shoe which disengages the flange of the counter from the clips 184 which yieldingly grip it against the counter-holder. The operator then depresses the treadle 32 a third time whereupon the operating parts return to their respective initial positions for a repetition of the machine cycle. During this portion of the machine cycle, the cam lever 238 (Fig. 8) operates to move the entire counter-handling assembly in order to transfer the cement-treated counter from its loading station to its inserting station and concomitantly to return the then empty counter-holder to its loading station.

Having thus described our invention, what we claim as new and desire to secure by Letters Patent of the United States is:

1. In an assembling machine, means for effecting relative movement of a lined upper and a cement-treated counter to assemble said parts together, and means constructed and arranged to engage the adjacent surfaces of the upper and lining and to space them apart from each other thereby to permit the assembly of the upper and counter without bringing them into contact with each other until they are substantially in assembled position.

2. In an assembling machine, means for effecting relative movement of a lined upper and a cement-treated counter to assemble said parts together, and a plurality of spacers constructed and arranged to engage respectively the inner surface of the upper and the outer surface of the lining to hold said parts away from each other during the assembling operation.

3. In an assembling machine, means for supporting a lined upper in a predetermined position, a plurality of spacers for holding the upper and lining apart from each other during the assembling operation, a counter holder, and means for actuating said holder to insert a cement-treated counter into the supported upper.

4. In an assembling machine, a plurality of spacers constructed and arranged to engage the inner surface of the upper and outer surface of the lining at the rear part of the upper to position the upper and lining apart from each other for the reception of a cement-treated counter, and automatic means for withdrawing said spacers from the upper after inserting the counter.

5. In an assembling machine, means for spacing the upper and lining away from each other for the reception of a cement-treated counter comprising two pairs of plates, one pair at each side of the rear part of the upper, the plates in each pair being arranged in converging relation to each other and positioned between the upper and the lining, and a single end plate at the back-line portion of the upper constructed and arranged to engage the outer surface of the lining.

6. In an assembling machine, means for spacing the upper and lining away from each other for the reception of a cement-treated counter comprising two pairs of plates, one pair at each side of the rear part of the upper, the plates in each pair being arranged in converging relation to each other and positioned between the upper and the lining, a single end plate at the back-line portion of the upper constructed and arranged to engage the outer surface of the lining, said end plate and side plates being relatively adjustable lengthwise of the upper.

7. In a shoe machine, a plurality of upper-supporting members constructed and arranged to engage the bottom edge of the heel portion of an upper arranged in generally upright position, means extending heightwise of the upper from said member for engagement with the inner surface of the upper, a wiper constructed and arranged to operate on the lasting margin of the heel portion of the upper, said wiper being positioned to provide support for the upper by engagement with its bottom edge, and means extending heightwise of the upper from said wiper for engagement with the inner surfaces of the upper.

8. In a shoe machine, means for supporting the rear portion of a shoe upper arranged in generally upright position comprising a plurality of members constructed and arranged to support the upper by its bottom edge, a wiper constructed and arranged to operate on the lasting margin of the heel portion of the upper, said wiper being positioned to provide support for the upper by engagement with its bottom edge, and means carried by said members and said wiper constructed and arranged to provide upper-engaging means which contact the inner surface of the bottom margin of the upper throughout substantially the entire periphery of the heel portion of the upper.

9. In a shoe machine, a plurality of upper-supporting members constructed and arranged to engage the bottom edge of the heel portion of an upper, a wiper constructed and arranged to operate on the lasting margin of the heel portion of the upper, said wiper being positioned to provide support for the upper by engagement with its bottom edge, means extending heightwise of the upper from said supporting members and from said wiper for engagement with the inner surface of the upper, and grippers constructed and arranged to act against said heightwise extending means to hold the upper in position on said supporting members.

10. In a shoe machine, a plurality of upper-supporting members constructed and arranged to engage the bottom edge of the heel portion of an upper, said members being relatively adjustable, a wiper constructed and arranged to operate on the lasting margin of the heel portion of the upper, said wiper being positioned to provide support for the upper by engagement with its bottom edge, a plurality of gripper jaws carried by said upper-supporting members respectively and arranged to act against portions of said members.

11. In a shoe machine, a plurality of upper-supporting members constructed and arranged to engage the bottom edge of the heel portion of an upper, a wiper constructed and arranged to operate on the lasting margin of the heel portion of the upper, said wiper being positioned to provide support for the upper by engagement with its bottom edge, upper-spreading members carried by said upper-supporting members respectively and constructed and arranged to engage the inner surface of the bottom margin of the upper, means extending heightwise of the upper for engagement with the inner surface of its bottom margin, said means forming a substantially continuous line with said upper-spreading members.

12. In a shoe machine, a plurality of upper-supporting members constructed and arranged to engage the bottom edge of the heel portion of an upper arranged in generally upright position, spreader members carried by said upper-supporting members respectively, and arranged for engagement with the inner surface of the lasting margin of the upper, said spreader members acting to hold the heel portion of the upper outspread sufficiently to permit a counter to move heightwise thereof into the upper without contacting its inner surface.

13. In a shoe machine, a plurality of upper-supporting members, a spreader for each upper-supporting member constructed and arranged to engage the inner surface of the lasting margin of the upper, said spreader members defining and being substantially coextensive with the periphery of the heel portion of the upper.

14. In a shoe machine, a plurality of upper-supporting members constructed and arranged to engage the bottom edge of the heel portion of an upper arranged in generally upright position, spreader members carried by said upper-supporting members respectively, and arranged for engagement with the inner surface of the lasting margin of the upper, said spreader members acting to hold the heel portion of the upper outspread sufficiently to permit a counter to move heightwise thereof into the upper without contacting its inner surface, and means on which said spreader members are mounted for adjustive movement relatively to each other.

15. In a machine for assembling lined uppers and counters, means for supporting a lined upper in a predetermined position in the machine, and a counter holder operable to immerse a counter mounted thereon in liquid cement and to insert the cement-treated counter into the supported upper.

16. In a machine for assembling lined uppers and counters, means for supporting a lined upper in a predetermined position in the machine, a counter holder and mechanism for actuating the holder to immerse a counter mounted thereon in liquid cement, then to return the counter to its initial position and finally to insert the counter into the supported upper.

17. In a machine for assembling lined uppers and counters, means for supporting a lined upper in a predetermined position in the machine, a counter holder and mechanism for actuating said holder to immerse a counter mounted thereon in liquid cement, to return the counter to its initial position, to move the counter widthwise thereof into a position in alinement with the supported upper heightwise thereof, to move the counter heightwise into a position adjacent to the bottom opening of the heel portion of the upper, and finally to move the counter heightwise of the upper with a heelward component of movement to bring the counter into its assembled position in the upper.

18. In a machine for assembling a counter and a lined upper, means for effecting the immersion of a counter in liquid cement, and means for effecting relative movement of the cement-treated counter and an upper to assemble them together.

19. In a machine for assembling a heel stiffener and a lined upper, means for immersing a heel stiffener in liquid cement, and means for inserting the cement-treated counter into a supported upper.

20. In a machine for assembling a heel stiffener and a lined upper, means for immersing a heel stiffener in liquid cement, means for inserting the cement-treated counter into a supported upper, and means for fastening the counter and upper to a sole.

21. In a machine for assembling a heel stiffener and a lined upper, means for immersing a heel stiffener in liquid cement, means for inserting a cement-treated stiffener into a lined upper, and means for bringing the lining into contact with the stiffener.

22. In a machine for assembling a heel stiffener and a lined upper, means for supporting an upper in a predetermined position in the machine, means for immersing a heel stiffener in liquid cement, and means for inserting the cement-treated stiffener into the supported upper.

23. In a machine for assembling a lined upper and a counter, means for supporting a lined upper in a predetermined position in the machine, and a counter holder operable to immerse the counter in liquid cement and to insert the cement-treated counter into the supported upper.

24. In a machine for assembling a counter and a lined upper, means for supporting a lined upper in a predetermined position in the machine, and means for spacing the lining and the upper from each other to provide for the reception of the counter.

25. In a machine for assembling a lined upper and a counter, a counter holder, and means for operating the holder to immerse a counter mounted thereon in liquid cement, then to lift the counter into a predetermined draining position in which its lower extremity is in contact with the liquid cement, and finally to return the counter to its loading position.

26. In a machine for assembling a lined upper and a counter, a counter holder, a gage for predetermining the orientation of the counter on the holder, and means for operating the holder to immerse the counter in liquid cement, then to lift the counter into a predetermined draining position in which the lower extremity of the counter is in contact with the liquid cement, and finally, to return the counter to its loading position.

27. In a machine for assembling a lined upper and a counter, means for supporting a lined upper in a predetermined position in the machine, a counter holder, means for operating the counter holder to immerse a counter mounted thereon in liquid cement, and means for operating said holder to insert the cement-treated counter into the supported upper by a movement first heightwise of the upper to a position adjacent to the bottom opening of the upper, then heightwise of the upper with a heelward component to bring the counter into its final position in the upper.

28. In a machine for assembling a lined upper and a counter, a counter holder having a predetermined counter-loading station, means for operating the holder to immerse a counter thereon in liquid cement and to return the cement-treated counter to the loading station, means for transferring the counter holder from its loading station to a counter-inserting station, and means for actuating the counter holder to insert the counter into a supported upper.

29. In a machine for assembling a lined upper and a counter, a counter holder, a carrier on which the holder is mounted, means for actuating said carrier to insert a counter on said holder into a lined upper supported in the machine, and guiding means for said carrier movable to transfer the counter holder from a counter-loading station to a counter-inserting station.

30. In a machine for assembling a lined upper and a counter, a counter holder, a carrier on which the holder is mounted, means for actuating said carrier to insert a counter on said holder into a lined upper supported in the machine, guiding means for said carrier movable to transfer the counter holder from a counter-loading station to a counter-inserting station, and a slide on which said guiding means is mounted, said slide being movable lengthwise of the upper to move the counter heelwardly of the upper.

31. In a machine for assembling a lined upper and a counter, a counter holder, means on which said holder is mounted for movement from a counter-loading station to a counter-inserting station, and mechanism for moving the counter holder from counter-loading station to a position in which a counter on the holder is immersed in liquid cement, said mechanism including operating members which are brought into operating engagement with each other by movement of the counter holder from counter-inserting station into counter-loading station.

32. In a machine for assembling a lined upper and a counter, means for supporting a lined upper in a predetermined position in the machine, a counter holder having a predetermined counter-loading station, means for moving the holder from counter-loading station to a counter-immersing station then back to the counter-loading station, means for then moving the counter holder from counter-loading station to a predetermined counter-inserting station, and means for moving the holder from the latter station to insert the counter into the supported upper.

33. In a machine for assembling a lined upper and a counter, means for supporting a lined upper in a predetermined position in the machine, a counter holder having a predetermined counter-loading station, means for moving the holder from counter-loading station to a counter-immersing station then back to the counter-loading station, means for then moving the counter-holder from counter-loading station to a predetermined counter-inserting station, means for moving the holder from the latter station to insert the counter into the supported upper, a wiper for wiping the lasting margin of the upper against the bottom margin of the counter, and means for fastening the lasting margin of the upper to the counter.

34. In a machine for assembling lined uppers and counters, counter-handling mechanism comprising a counter holder, a carrier for the counter holder constructed and arranged for movement heightwise of the supported upper, a carrier-supporting member movable widthwise of the upper, and means on which said member is mounted for movement lengthwise of the upper.

35. In a machine for assembling lined uppers and counters, counter-handling mechanism comprising a counter holder, a carrier on which said holder is pivotally mounted for movement to immerse a counter mounted thereon in liquid cement, guides between which said carrier is mounted for movement heightwise of the upper, and a slide in which said guides are movable widthwise of the upper, said slide being constructed and arranged for movement lengthwise of the upper.

36. In a machine for assembling lined uppers and counters, means for supporting a lined upper in a predetermined position in the machine, a counter holder having a counter-loading station and a counter-inserting station, and mechanism for actuating the counter holder to immerse a counter mounted thereon in liquid cement, said mechanism including operating members which are brought into operating engagement with each other by movement of the counter holder from its counter-inserting station to its counter-loading station and are disengaged by movement of the counter holder in the opposite direction.

37. In a machine for assembling a lined upper and a counter, means for supporting a lined upper in a predetermined position in the machine, means for inserting a counter into the upper, and means for laying the heel portion of the lining smoothly against the inner surface of the counter before positioning the last within the upper.

38. In a machine for assembling lined uppers and counters, means for supporting a lined upper in a predetermined position in the machine, a counter holder operable to insert a counter into the supported upper, and means for wiping the rear part of the lining against the inner surface of the counter before positioning the last within the upper.

39. In a machine for assembling lined uppers and counters, means for supporting a lined upper in a predetermined position in the machine, and means for wiping the rear part of the lining against a counter positioned within the upper comprising a lining wiper constructed and arranged to act against the back-line portion only of the lining.

40. In a machine for assembling lined uppers and counters, means for supporting a lined upper, and means for wiping the rear part of the lining against a counter positioned in the upper comprising a lining wiper constructed and arranged to operate against the back-line portion only of the lining and operable to wipe said back-line portion heightwise of the upper from the top edge to the counter flange then toewardly of the upper to the edge of the counter flange.

41. In a machine for assembling lined uppers and counters, means for supporting a lined upper in a predetermined position in the machine, a lining wiper for wiping the rear part of the lining against a counter positioned in the upper, means for operating the wiper, and means for directing the movement of the wiper to cause the wiper to move heightwise of the upper from its top edge to the counter flange in a path having a curvature corresponding generally to the heightwise curvature of the back-line portion of the upper, then toewardly to wipe the bottom margin of the lining against the counter flange, then heightwise of the upper through a path spaced toewardly from the back-line portion of the lining to remove the wiper from the upper.

42. In a machine for assembling lined uppers and counters, means for supporting a lined upper in a predetermined position in the machine, a lining wiper for wiping the rear portion of the lining against a counter positioned in the upper, a counter holder, a cam member for directing the operating movement of the wiper, and means for directing the return movement of the wiper in a path spaced from the wiped portion of the lining.

43. In a machine for assembling lined uppers and counters, means for supporting a lined upper in a predetermined position in the machine, a wiper for wiping the rear part of the lining against a counter positioned in the upper, a carrier for the wiper, means for directing the movements of the carrier comprising a cam member for directing the operating movement of the wiper and a member for directing the return movement of the wiper, a cam follower on the wiper carrier, and guiding means for directing the approach of the cam follower to the cam member including a hinged member which yields to permit the return of the follower to its initial position during the retraction of the wiper.

44. In a machine for assembling lined uppers and counters, means for supporting a lined upper in a predetermined position in the machine, a lining wiper for wiping the rear part of the lining against a counter positioned in the upper, means for moving the wiper heightwise of the upper, means for moving the wiper toewardly of the upper to wipe the bottom margin of the lining against the flange of the counter, and yielding means for causing the wiper to press the margin of the lining against the flange of the counter during its toeward movement.

45. In a machine for assembling a lined upper and a counter, means for supporting a lined upper in a predetermined position in the machine, means for inserting a counter into the upper, means for spacing the rear part of the lining from the inner surface of the upper to provide for the insertion of the counter, and a lining wiper for wiping the lining against the inner surface of the counter.

46. In a machine for assembling a lined upper and a counter, means for supporting a lined upper in a predetermined position in the machine, means for immersing a counter in liquid cement, means for inserting a cement-treated counter into the supported upper, and means for wiping the lining at the rear part of the upper against the inner surface of the counter.

47. In a machine for assembling a lined upper and a counter, means for supporting a lined upper in a predetermined position in the machine, means for wiping the lining against the inner surface of a counter positioned in the upper before inserting a last into the upper, means for wiping the lasting margin at the back-line portion of the upper against the bottom margin of the counter, and means for securing upper, counter and lining in assembled position.

48. In a machine for assembling a lined upper and a counter, means for supporting a lined upper in a predetermined position in the machine, a counter holder, means for operating the holder to immerse a counter thereon in liquid cement, means for operating the holder to insert a cement-treated counter into the supported upper, and means for wiping the lining at the rear portion of the upper against the inner surface of a counter supported in the upper by the holder.

49. In a machine for assembling lined uppers and counters, means for supporting a lined upper in a predetermined position in the machine, a wiper for wiping the rear part of the lining against a counter positioned in the upper, a carrier for the wiper, a cam member for directing the operating movement of the carrier, a cam follower on said carrier, a rail for directing the follower to said cam, a normally closed gate through which the cam follower travels during the retracting movement of the wiper, said gate in its normally closed position serving as a portion of said rail.

50. In a shoe machine, means for effecting relative movement of a lined upper and a flanged counter to bring them into assembled relation to each other, a wiper for wiping the lasting margin of the upper against the flange of the counter, said wiper being constructed and arranged to carry a fastening into fastening-inserting position, fastening-inserting means for securing said upper and counter together, and means for operating said wiper and releasing said fastening-inserting means for fastening-inserting movement.

51. In a shoe machine, means for effecting relative movement of a lined upper and a flanged counter to bring them into assembled relation to each other, a wiper constructed and arranged to operate upon the lasting margin of the upper to bring it into overwiped relation to the flange of the counter, means carried by the wiper for supporting a fastening, a member constructed and arranged to drive a fastening heightwise of the upper through the bottom margin of the upper and the flange of the counter, and automatic means for operating the wiper and releasing said fastening-driving member for fastening-driving movement.

52. In a shoe machine, means for effecting relative movement of a lined upper and a flanged counter to bring them into assembled relation to each other, fastening-inserting means for securing said parts in assembled position to an insole on a last bottom, an actuator therefor, a latch for holding said fastening-inserting means retracted, an operating instrumentality, and means operable to actuate said operating instrumentality and to release said latch.

53. In a shoe machine, means for supporting an upper in a predetermined position in the machine, a wiper constructed and arranged to operate on the lasting margin of the upper, a tack tube, said wiper being constructed and arranged to receive a tack from said tube and to carry it into a position in which it is to be driven through the lasting margin of the upper and adjacent shoe materials, a tack driving pin, a latch for holding said pin retracted, and means operable to advance the wiper and to release said latch.

54. In a machine for assembling a lined upper and a counter, means for supporting a lined upper in a predetermined position in the machine, a counter holder operable to insert a counter into the supported upper, and fastening-inserting means constructed and arranged for movement with said holder and operable to secure said shoe parts in assembled position.

55. In a machine for assembling a lined upper and a counter, means for supporting a lined upper in a predetermined position in the machine, a counter holder, a fastening-inserting member operable to secure the upper and counter in assembled position, means for actuating said fastening-inserting member, said member and its actuating means being constructed and arranged for movement with the counter holder during the insertion of the counter into the upper.

56. In a machine for assembling a lined upper and a counter, means for supporting an upper in a predetermined position in the machine, a counter holder operable to insert a counter into the supported upper, a member movable with the counter holder and constructed and arranged to insert a fastening to secure the upper and counter in assembled position, an actuator for said member, and means operated by the counter-inserting movement of the counter holder for energizing said actuator.

57. In a machine for assembling a lined upper and a counter, means for supporting an upper in a predetermined position in the machine, a counter holder operable to insert a counter into the supported upper, a driver movable with the counter holder and constructed and arranged to drive a fastening to secure the upper and counter in assembled position, an actuator for said driver, means operated by the counter-inserting movement of said counter holder for energizing said actuator, and a latch movable with said counter holder and operable to hold said driver in retracted position.

58. In a machine for assembling a lined upper and a counter, means for supporting an upper in a predetermined position in the machine, a counter holder operable to insert a counter into the supported upper, a member movable with the counter holder and constructed and arranged to insert a fastening to secure the upper and counter in assembled position, an actuator for said member, means operated by the counter-inserting movement of said counter holder for energizing said actuator, a latch movable with said counter holder and operable to hold said fastening-inserting member in retracted position, and means operable during the return movement of the counter holder for retracting the fastening-inserting member and resetting the latch.

59. In a machine for assembling a lined upper and a molded counter, means for supporting a lined upper in a predetermined position in the machine, a counter holder operable to insert a counter into the supported upper, a fastening-inserting assembly operable to secure said upper and counter in assembled position and constructed and arranged for movement with the counter holder, said assembly comprising a fastening-inserting member, a lever for operating said member, a latch for holding said lever retracted, an actuator for said lever, and means operable by movement of the counter holder for energizing said actuator.

60. In a machine for assembling a lined upper and a counter, means for supporting a lined upper in a predetermined position in the machine, a counter holder operable to insert a counter into the supported upper, a wiper constructed and arranged to operate on the lasting margin of the upper, means carried by the wiper for bringing a fastening into driving position, and means movable with the counter holder for driving said fastening.

61. In a machine for assembling a lined upper and a counter, means for supporting a lined upper in a predetermined position in the machine, a counter holder for inserting a counter into the supported upper, a wiper constructed and arranged to operate on the lasting margin of the supported upper, means carried by the wiper for transferring a fastening from a receiving position to a driving position, a fastening-inserting member mounted on the counter holder, an actuator for said member, and means operable to advance the wiper and to release said actuator for the fastening-inserting operation.

62. In a machine for assembling a lined upper and a counter, means for supporting a lined upper in a predetermined position in the machine, a counter holder for inserting a counter into the supported upper, a wiper constructed and arranged to operate on the lasting margin of the upper, a tack-receiving pin carried by the wiper, a tack driver mounted on the counter holder, an actuator for said driver, and means for advancing said wiper and for releasing said driver as the wiper comes to the limit of its advancement.

63. In an assembling machine, a counter holder comprising a plate having the general outline of the heel seat portion of a shoe bottom, counter-engaging members on said plate for holding a counter in determinate position thereon, a fastening-inserting member carried by the counter holder and constructed and arranged to operate through an opening provided in said plate, and means carried by the counter holder for actuating said fastening-inserting member.

64. In a machine for assembling a lined upper and a counter, the combination with a counter holder operable to insert a counter into an upper supported in the machine, of fastening-inserting means characterized by its construction and arrangement for movement with the counter holder into fastening-inserting position.

65. In a machine for assembling a lined upper and a counter, the combination with a counter holder operable to insert a counter into an upper supported in the machine, of a fastening-inserting assembly characterized by its construction and arrangement for movement with the counter holder into fastening-inserting position, said fastening-inserting assembly comprising a fastening-driving member, a spring for actuating said member, means operated by the counter-inserting movement of the counter holder for energizing said spring, and a latch operable to hold said fastening-driving member in retracted position until the fastening-inserting assembly has been advanced into fastening-inserting position.

66. In a machine for assembling a lined upper and a counter, the combination with a counter holder operable to insert a counter into an upper supported in the machine, of a fastening-inserting assembly characterized by its construction and arrangement for movement with the counter holder into fastening-inserting position, said fastening-inserting assembly comprising a fastening-driving member, a spring for actuating said member, means operated by the counter-inserting movement of the counter holder for energizing said spring, a latch operable to hold said fastening-driving member in retracted position until the fastening-inserting assembly has been advanced into fastening-inserting position, and means constructed and arranged to operate during the return movement of the counter holder to retract the fastening-driving member and reset the latch.

67. In a machine for assembling a lined upper and a counter, means for supporting a lined upper in a predetermined position in the machine, two counter holders, means for alternately actuating said counter holders to immerse counters thereon in liquid cement, and means for alternately actuating said counter holders to insert cement-treated counters into supported uppers, the counter-immersing operation of each counter holder occurring in the same cycle as the counter-inserting operation of the other counter holder.

68. In a machine for assembling a lined upper and a counter, means for supporting a lined upper in a predetermined position in the machine, a plurality of counter holders, and means whereby said holders are actuated successively to insert a counter into the supported upper.

69. In a machine for assembling a lined upper and a counter, means for supporting a lined upper in a predetermined position in the machine, a reservoir for liquid cement, a counter-carrying assembly comprising two counter holders constructed and arranged to move in unison widthwise of the upper, said counter holders being so spaced from each other widthwise of the upper that when one is in position to move a counter thereon heightwise thereof into the supported upper, the other is positioned to immerse a counter mounted thereon in a body of liquid cement in said reservoir.

70. In a machine for assembling a lined upper and a counter, means for supporting a lined upper, counter-handling mechanism comprising two counter holders, means for alternatively actuating said counter holders to immerse counters mounted thereon in a reservoir of liquid cement, and means for alternatively actuating said counter holders to insert a cement-treated counter into the supported upper.

71. In a machine for assembling a lined upper and a counter, means for supporting a lined upper, counter-handling mechanism comprising two counter holders, means for alternatively actuating said counter holders to immerse counters mounted thereon in a reservoir of liquid cement, means for alternatively actuating said counter holders to insert a cement-treated counter into the supported upper, and means for effecting relative movement of the upper and the counter holders widthwise of the upper to arrange the upper and a cement-treated counter for assembly by relative movement heightwise of the upper.

72. In a machine for assembling a lined upper and a counter, means for supporting a lined upper, two counter holders, means operable alternatively on said counter holders to immerse a counter in liquid cement, means operable alternatively on said counter holders to insert a cement-treated counter into the supported upper, and means for effecting the transfer of said counter holders between two counter-immersing stations and one counter-inserting station.

73. In a machine for assembling a lined upper and a counter, means for supporting a lined upper, a counter holder, means for actuating said counter holder to immerse a counter thereon in liquid cement, a carrier for said counter holder, means for actuating said carrier to insert a cement-treated counter into the supported upper, spacers for holding the upper and its lining spaced from each other to provide for the reception of the cement-treated counter, and a lining wiper for wiping the lining against the inner surface of the inserted counter.

74. In a machine for assembling a lined upper and a counter, means for supporting a lined upper in a predetermined position in the machine, two counter holders, and mechanism whereby said holders are moved in unison widthwise of the upper to transfer one counter holder from a counter-loading station to a counter-inserting station, and to transfer the other counter holder from its counter-inserting station to its counter-loading station.

75. In a machine for assembling a lined upper and a counter, means for supporting a lined upper in a predetermined position in the machine, two counter holders, mechanism whereby said holders are moved in unison widthwise of the upper to transfer one counter holder from a counter-loading station to a counter-inserting station, and to transfer the other counter holder from its counter-inserting station to its counter-loading station, means rendered operative by said counter-transferring movement for actuating one of said counter holders to immerse a dry counter into liquid cement, and means rendered operative by said counter-transferring movement for actuating the other counter holder to insert a cement-treated counter into the supported upper.

LEE HAROLD CUSHMAN.
ARTHUR F. PYM.